(12) United States Patent
Townsend et al.

(10) Patent No.: US 10,019,080 B2
(45) Date of Patent: Jul. 10, 2018

(54) UNINTENTIONAL TOUCH REJECTION

(71) Applicant: Microsoft Technology Licensing, LLC, Redmond, WA (US)

(72) Inventors: Reed L. Townsend, Seattle, WA (US); Alexander J. Kolmykov-Zotov, Sammamish, WA (US); Steven P. Dodge, Sammamish, WA (US); Bryan D. Scott, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/453,464

(22) Filed: Mar. 8, 2017

(65) Prior Publication Data

US 2017/0177101 A1 Jun. 22, 2017

Related U.S. Application Data

(63) Continuation of application No. 14/979,910, filed on Dec. 28, 2015, now Pat. No. 9,594,457, which is a continuation of application No. 14/145,204, filed on Dec. 31, 2013, now Pat. No. 9,261,964, which is a continuation of application No. 13/657,662, filed on Oct. 22, 2012, now Pat. No. 8,659,570, which is a
(Continued)

(51) Int. Cl.
*G06F 3/0354* (2013.01)
(52) U.S. Cl.
CPC .............................. *G06F 3/03545* (2013.01)
(58) Field of Classification Search
None
See application file for complete search history.

(56) References Cited

U.S. PATENT DOCUMENTS 4,686,332 A 8/1987 Greanias et al.
4,843,538 A 6/1989 Lane et al.
(Continued)

FOREIGN PATENT DOCUMENTS

CN 1326564 12/2001
CN 1578430 2/2005
(Continued)

OTHER PUBLICATIONS

"3M Touchware TM Software for Windows User Guide", 2002, Available at: http://multimedia.3m.com/mws/mediawebserver?mwsId=SSSSSu7zK1fslxtUM821OY_Bev7qel7zHvTSevTSeSSSSSS, retrieved on Jun. 3, 2013, 65 pages.
(Continued)

*Primary Examiner* — Kenneth B Lee, Jr.

(57) ABSTRACT

A method for rejecting an unintentional palm touch is disclosed. In at least some embodiments, a touch is detected by a touch-sensitive surface associated with a display. Characteristics of the touch may be used to generate a set of parameters related to the touch. In an embodiment, firmware is used to determine a reliability value for the touch. The reliability value and the location of the touch is provided to a software module. The software module uses the reliability value and an activity context to determine a confidence level of the touch. In an embodiment, the confidence level may include an evaluation of changes in the reliability value over time. If the confidence level for the touch is too low, it may be rejected.

20 Claims, 11 Drawing Sheets

Related U.S. Application Data continuation of application No. 13/230,700, filed on Sep. 12, 2011, now Pat. No. 8,294,686, which is a continuation of application No. 11/324,157, filed on Dec. 30, 2005, now Pat. No. 8,018,440.

(56) References Cited

U.S. PATENT DOCUMENTS

| | | |
|---|---|---|
| 4,868,912 A | 9/1989 | Doering |
| 5,231,578 A | 7/1993 | Levin et al. |
| 5,237,647 A | 8/1993 | Roberts et al. |
| 5,252,951 A | 10/1993 | Tannenbaum et al. |
| 5,351,995 A | 10/1994 | Booker et al. |
| 5,404,458 A | 4/1995 | Zetts |
| 5,463,725 A | 10/1995 | Henckel et al. |
| 5,491,783 A | 2/1996 | Douglas et al. |
| 5,496,974 A | 3/1996 | Akebi et al. |
| 5,497,776 A | 3/1996 | Yamazaki et al. |
| 5,511,148 A | 4/1996 | Wellner |
| 5,555,369 A | 9/1996 | Menendez et al. |
| 5,596,697 A | 1/1997 | Foster et al. |
| 5,661,773 A | 8/1997 | Swerdloff et al. |
| 5,664,128 A | 9/1997 | Bauer |
| 5,664,133 A | 9/1997 | Malamud et al. |
| 5,694,150 A | 12/1997 | Sigona et al. |
| 5,731,813 A | 3/1998 | O'Rourke et al. |
| 5,761,485 A | 6/1998 | Munyan |
| 5,777,596 A | 7/1998 | Herbert |
| 5,817,019 A | 10/1998 | Kawashima |
| 5,821,930 A | 10/1998 | Hansen |
| 5,838,889 A | 11/1998 | Booker et al. |
| 5,898,434 A | 4/1999 | Small et al. |
| 5,943,052 A | 8/1999 | Allen |
| 5,969,720 A | 10/1999 | Lisle et al. |
| 6,029,214 A | 2/2000 | Dorfman et al. |
| 6,037,937 A | 3/2000 | Beaton et al. |
| 6,061,061 A | 5/2000 | Conrad et al. |
| 6,072,476 A | 6/2000 | Harada et al. |
| 6,097,392 A | 8/2000 | Leyerle |
| 6,115,724 A | 9/2000 | Booker et al. |
| 6,167,439 A | 12/2000 | Levine et al. |
| 6,208,331 B1 | 3/2001 | Singh |
| 6,239,798 B1 | 5/2001 | Ludolph et al. |
| 6,246,395 B1 | 6/2001 | Goyins |
| 6,266,050 B1 | 7/2001 | Oh et al. |
| 6,278,443 B1 | 8/2001 | Amro et al. |
| 6,310,610 B1 | 10/2001 | Beaton et al. |
| 6,340,979 B1 | 1/2002 | Beaton et al. |
| 6,396,523 B1 | 5/2002 | Segal et al. |
| 6,459,424 B1 | 10/2002 | Resman |
| 6,507,352 B1 | 1/2003 | Cohen et al. |
| 6,525,749 B1 | 2/2003 | Moran et al. |
| 6,545,669 B1 | 4/2003 | Kinawi et al. |
| 6,831,631 B2 | 12/2004 | Chuang |
| 6,859,909 B1 | 2/2005 | Lerner et al. |
| 6,920,619 B1 | 7/2005 | Milekic |
| 6,957,233 B1 | 10/2005 | Beezer et al. |
| 7,023,427 B2 | 4/2006 | Kraus et al. |
| 7,053,887 B2 | 5/2006 | Kraus et al. |
| 7,209,125 B2 | 4/2007 | Kong et al. |
| 7,295,191 B2 | 11/2007 | Kraus et al. |
| 7,302,650 B1 | 11/2007 | Allyn et al. |
| 7,338,224 B2 | 3/2008 | Jones et al. |
| 7,339,580 B2 | 3/2008 | Westerman et al. |
| 7,454,717 B2 | 11/2008 | Hinckley et al. |
| 7,479,949 B2 | 1/2009 | Jobs |
| 7,506,269 B2 | 3/2009 | Lang |
| 7,532,196 B2 | 5/2009 | Hinckley |
| 7,561,146 B1 | 7/2009 | Hotelling |
| 7,605,804 B2 | 10/2009 | Wilson |
| 7,636,071 B2 | 12/2009 | O'Gorman |
| 7,643,012 B2 | 1/2010 | Kim et al. |
| 7,656,393 B2 | 2/2010 | King et al. |
| 7,676,767 B2 | 3/2010 | Hofmeister et al. |
| 7,760,187 B2 | 7/2010 | Kennedy |
| 7,821,780 B2 | 10/2010 | Choy |
| 7,847,789 B2 | 12/2010 | Kolmykov-Zotov et al. |
| D631,043 S | 1/2011 | Kell |
| 7,898,529 B2 | 3/2011 | Fitzmaurice et al. |
| 7,956,847 B2 | 6/2011 | Christie |
| 8,018,440 B2 | 9/2011 | Townsend et al. |
| 8,102,858 B1 | 1/2012 | Rahim et al. |
| 8,122,384 B2 | 2/2012 | Partridge et al. |
| 8,169,418 B2 | 5/2012 | Birkler |
| 8,181,122 B2 | 5/2012 | Davidson |
| 8,212,788 B2 | 7/2012 | Lam |
| 8,239,785 B2 | 8/2012 | Hinckley |
| 8,261,213 B2 | 9/2012 | Hinckley |
| 8,274,482 B2 | 9/2012 | Kim et al. |
| 8,284,170 B2 | 10/2012 | Bernstein |
| 8,289,289 B2 | 10/2012 | Rimon et al. |
| 8,294,669 B2 | 10/2012 | Partridge et al. |
| 8,294,686 B2 | 10/2012 | Townsend et al. |
| 8,327,295 B2 | 12/2012 | Ikeda et al. |
| 8,335,996 B2 | 12/2012 | Davidson et al. |
| 8,345,008 B2 | 1/2013 | Lee et al. |
| 8,373,660 B2 | 2/2013 | Pallakoff |
| 8,395,600 B2 | 3/2013 | Kawashima et al. |
| 8,407,606 B1 | 3/2013 | Davidson et al. |
| 8,473,870 B2 | 6/2013 | Hinckley et al. |
| 8,477,114 B2 | 7/2013 | Miller et al. |
| 8,539,384 B2 | 9/2013 | Hinckley et al. |
| 8,581,864 B2 | 11/2013 | Miyazawa et al. |
| 8,587,526 B2 | 11/2013 | Engelhardt et al. |
| 8,640,047 B2 | 1/2014 | Mouton et al. |
| 8,643,628 B1 | 2/2014 | Eriksson et al. |
| 8,659,570 B2 | 2/2014 | Townsend et al. |
| 8,707,174 B2 | 4/2014 | Hinckley et al. |
| 8,751,970 B2 | 6/2014 | Hinckley et al. |
| 8,788,967 B2 | 7/2014 | Davidson et al. |
| 8,799,827 B2 | 8/2014 | Hinckley et al. |
| 8,810,533 B2 | 8/2014 | Chen |
| 8,836,648 B2 | 9/2014 | Wilairat |
| 8,836,659 B2 | 9/2014 | Chen et al. |
| 9,047,009 B2 | 6/2015 | King |
| 9,075,522 B2 | 7/2015 | Hinckley et al. |
| 9,256,342 B2 | 2/2016 | Davidson |
| 9,261,964 B2 | 2/2016 | Townsend et al. |
| 9,274,682 B2 | 3/2016 | Hinckley et al. |
| 9,310,994 B2 | 4/2016 | Hinckley et al. |
| 9,360,972 B1 | 6/2016 | Avery et al. |
| 9,367,205 B2 | 6/2016 | Hinckley et al. |
| 9,477,337 B2 | 10/2016 | Cady et al. |
| 9,519,419 B2 | 12/2016 | Hinckley et al. |
| 9,594,457 B2 | 3/2017 | Townsend et al. |
| 2001/0012000 A1 | 8/2001 | Eberhard |
| 2001/0035860 A1 | 11/2001 | Segal et al. |
| 2001/0047263 A1 | 11/2001 | Smith et al. |
| 2002/0060701 A1 | 5/2002 | Naughton et al. |
| 2002/0097229 A1 | 7/2002 | Rose et al. |
| 2002/0101457 A1 | 8/2002 | Lang |
| 2002/0116421 A1 | 8/2002 | Fox et al. |
| 2003/0016253 A1 | 1/2003 | Aoki et al. |
| 2003/0063073 A1 | 4/2003 | Geaghan et al. |
| 2003/0067451 A1* | 4/2003 | Tagg .................... G01V 3/088 345/174 |
| 2003/0095095 A1 | 5/2003 | Pihlaja |
| 2003/0098858 A1 | 5/2003 | Perski et al. |
| 2003/0142081 A1 | 7/2003 | Iizuka |
| 2003/0179541 A1 | 9/2003 | Sullivan |
| 2003/0231219 A1 | 12/2003 | Leung |
| 2004/0001048 A1 | 1/2004 | Kraus et al. |
| 2004/0012572 A1 | 1/2004 | Sowden et al. |
| 2004/0155871 A1 | 8/2004 | Perski et al. |
| 2004/0236741 A1 | 11/2004 | Burstrom et al. |
| 2004/0236774 A1 | 11/2004 | Baird et al. |
| 2004/0255254 A1 | 12/2004 | Weingart et al. |
| 2005/0012723 A1 | 1/2005 | Pallakoff |
| 2005/0017957 A1* | 1/2005 | Yi ........................ G06F 3/04886 345/173 |
| 2005/0017959 A1 | 1/2005 | Kraus et al. |
| 2005/0052432 A1 | 3/2005 | Kraus et al. |
| 2005/0076300 A1 | 4/2005 | Martinez |
| 2005/0101864 A1 | 5/2005 | Zheng et al. |

(56) References Cited

U.S. PATENT DOCUMENTS

| | | |
|---|---|---|
| 2005/0129314 A1 | 6/2005 | Chen |
| 2005/0162402 A1 | 7/2005 | Watanachote |
| 2005/0177796 A1 | 8/2005 | Takahashi |
| 2005/0184973 A1 | 8/2005 | Lum et al. |
| 2005/0189154 A1 | 9/2005 | Perski et al. |
| 2005/0198592 A1 | 9/2005 | Keely, Jr. et al. |
| 2006/0001650 A1 | 1/2006 | Robbins et al. |
| 2006/0010371 A1 | 1/2006 | Shur et al. |
| 2006/0012580 A1 | 1/2006 | Perski et al. |
| 2006/0012581 A1 | 1/2006 | Haim et al. |
| 2006/0022955 A1 | 2/2006 | Kennedy |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0031786 A1 | 2/2006 | Hillis et al. |
| 2006/0071912 A1 | 4/2006 | Hill et al. |
| 2006/0092177 A1 | 5/2006 | Blasko |
| 2006/0093219 A1 | 5/2006 | Gounares et al. |
| 2006/0101354 A1 | 5/2006 | Hashimoto et al. |
| 2006/0109252 A1 | 5/2006 | Kolmykov-Zotov et al. |
| 2006/0112335 A1 | 5/2006 | Hofmeister et al. |
| 2006/0161870 A1 | 7/2006 | Hotelling et al. |
| 2006/0197750 A1 | 9/2006 | Kerr et al. |
| 2006/0197753 A1 | 9/2006 | Hotelling |
| 2006/0197963 A1 | 9/2006 | Royal et al. |
| 2006/0238517 A1 | 10/2006 | King et al. |
| 2006/0238520 A1 | 10/2006 | Westerman et al. |
| 2006/0262105 A1 | 11/2006 | Smith et al. |
| 2006/0262188 A1 | 11/2006 | Elyada et al. |
| 2006/0267955 A1 | 11/2006 | Hino |
| 2006/0279548 A1 | 12/2006 | Geaghan |
| 2006/0284852 A1 | 12/2006 | Hofmeister et al. |
| 2007/0043744 A1 | 2/2007 | Carro |
| 2007/0063987 A1 | 3/2007 | Sato et al. |
| 2007/0075976 A1 | 4/2007 | Kun et al. |
| 2007/0097096 A1 | 5/2007 | Rosenberg |
| 2007/0106939 A1 | 5/2007 | Qassoudi |
| 2007/0109274 A1 | 5/2007 | Reynolds |
| 2007/0120762 A1 | 5/2007 | O'Gorman |
| 2007/0146337 A1 | 6/2007 | Ording et al. |
| 2007/0146347 A1 | 6/2007 | Rosenberg |
| 2007/0150496 A1 | 6/2007 | Feinsmith |
| 2007/0152976 A1 | 7/2007 | Townsend et al. |
| 2007/0168890 A1 | 7/2007 | Zhao et al. |
| 2007/0171211 A1 | 7/2007 | Perski et al. |
| 2007/0236468 A1 | 10/2007 | Tuli |
| 2007/0242056 A1 | 10/2007 | Engelhardt et al. |
| 2007/0262951 A1 | 11/2007 | Huie et al. |
| 2008/0001924 A1 | 1/2008 | de las Reyes et al. |
| 2008/0005703 A1 | 1/2008 | Radivojevic et al. |
| 2008/0036743 A1 | 2/2008 | Westerman |
| 2008/0040692 A1 | 2/2008 | Sunday et al. |
| 2008/0042978 A1 | 2/2008 | Perez-Noquera |
| 2008/0046425 A1 | 2/2008 | Perski |
| 2008/0052945 A1 | 3/2008 | Matas et al. |
| 2008/0059914 A1 | 3/2008 | Allyn et al. |
| 2008/0062141 A1 | 3/2008 | Chandhri |
| 2008/0065720 A1 | 3/2008 | Brodersen et al. |
| 2008/0074402 A1 | 3/2008 | Cornish et al. |
| 2008/0082903 A1 | 4/2008 | McCurdy et al. |
| 2008/0084400 A1 | 4/2008 | Rosenberg |
| 2008/0164982 A1 | 7/2008 | Andrews et al. |
| 2008/0165141 A1 | 7/2008 | Christie |
| 2008/0165255 A1 | 7/2008 | Christie et al. |
| 2008/0168382 A1 | 7/2008 | Louch et al. |
| 2008/0168396 A1 | 7/2008 | Matas et al. |
| 2008/0168403 A1 | 7/2008 | Westerman et al. |
| 2008/0180404 A1 | 7/2008 | Han et al. |
| 2008/0211766 A1 | 9/2008 | Westerman et al. |
| 2008/0211778 A1 | 9/2008 | Ording et al. |
| 2008/0218494 A1 | 9/2008 | Perski et al. |
| 2008/0229192 A1 | 9/2008 | Gear et al. |
| 2008/0249682 A1 | 10/2008 | Wisniewski et al. |
| 2008/0278455 A1 | 11/2008 | Atkins et al. |
| 2008/0303798 A1 | 12/2008 | Matsudate et al. |
| 2009/0019188 A1 | 1/2009 | Mattice et al. |
| 2009/0033632 A1 | 2/2009 | Szolyga et al. |
| 2009/0054107 A1 | 2/2009 | Feland, III et al. |
| 2009/0058830 A1 | 3/2009 | Herz |
| 2009/0059730 A1 | 3/2009 | Lyons et al. |
| 2009/0064012 A1 | 3/2009 | Tremblay |
| 2009/0074255 A1 | 3/2009 | Holm |
| 2009/0077501 A1 | 3/2009 | Partridge et al. |
| 2009/0079699 A1 | 3/2009 | Sun |
| 2009/0094562 A1 | 4/2009 | Jeong et al. |
| 2009/0096758 A1 | 4/2009 | Hotelling et al. |
| 2009/0117943 A1 | 5/2009 | Lee et al. |
| 2009/0128505 A1 | 5/2009 | Partridge et al. |
| 2009/0138830 A1 | 5/2009 | Borgaonkar et al. |
| 2009/0143141 A1 | 6/2009 | Wells et al. |
| 2009/0153289 A1 | 6/2009 | Hope et al. |
| 2009/0153438 A1 | 6/2009 | Miller et al. |
| 2009/0167696 A1 | 7/2009 | Griffin |
| 2009/0167702 A1 | 7/2009 | Nurmi |
| 2009/0174679 A1 | 7/2009 | Westerman |
| 2009/0184921 A1 | 7/2009 | Scott et al. |
| 2009/0193366 A1 | 7/2009 | Davidson |
| 2009/0217211 A1 | 8/2009 | Hildreth et al. |
| 2009/0249236 A1 | 10/2009 | Westerman et al. |
| 2009/0249247 A1 | 10/2009 | Tseng et al. |
| 2009/0251432 A1 | 10/2009 | Wang et al. |
| 2009/0251434 A1 | 10/2009 | Rimon et al. |
| 2009/0256857 A1 | 10/2009 | Davidson et al. |
| 2009/0276701 A1 | 11/2009 | Nurmi |
| 2009/0278806 A1 | 11/2009 | Duarte et al. |
| 2009/0282332 A1 | 11/2009 | Porat |
| 2009/0284478 A1 | 11/2009 | De la Torre Baltierra |
| 2009/0284488 A1 | 11/2009 | Sip |
| 2009/0295753 A1 | 12/2009 | King et al. |
| 2009/0307589 A1 | 12/2009 | Inose et al. |
| 2009/0309846 A1 | 12/2009 | Trachtenberg et al. |
| 2009/0320070 A1 | 12/2009 | Inoguchi |
| 2009/0327963 A1 | 12/2009 | Mouilleseaux et al. |
| 2009/0327975 A1 | 12/2009 | Stedman |
| 2010/0013768 A1 | 1/2010 | Leung |
| 2010/0013792 A1 | 1/2010 | Fukushima |
| 2010/0016049 A1 | 1/2010 | Shirakawa et al. |
| 2010/0020025 A1 | 1/2010 | Lemort et al. |
| 2010/0039392 A1 | 2/2010 | Pratt et al. |
| 2010/0042827 A1 | 2/2010 | Pratt et al. |
| 2010/0045705 A1 | 2/2010 | Vertegaal et al. |
| 2010/0050076 A1 | 2/2010 | Roth |
| 2010/0051355 A1 | 3/2010 | Yang |
| 2010/0053103 A1 | 3/2010 | No et al. |
| 2010/0053861 A1 | 3/2010 | Kim et al. |
| 2010/0058182 A1 | 3/2010 | Jung |
| 2010/0060607 A1 | 3/2010 | Ludwig |
| 2010/0066667 A1 | 3/2010 | MacDougall et al. |
| 2010/0066694 A1 | 3/2010 | Jonsdottir |
| 2010/0066698 A1 | 3/2010 | Seo |
| 2010/0079392 A1 | 4/2010 | Chiang et al. |
| 2010/0081475 A1 | 4/2010 | Chiang et al. |
| 2010/0083154 A1 | 4/2010 | Takeshita |
| 2010/0083190 A1 | 4/2010 | Roberts et al. |
| 2010/0088641 A1 | 4/2010 | Choi |
| 2010/0090971 A1 | 4/2010 | Choi et al. |
| 2010/0097338 A1 | 4/2010 | Miyashita et al. |
| 2010/0103136 A1 | 4/2010 | Ono et al. |
| 2010/0105443 A1 | 4/2010 | Vaisanen |
| 2010/0107067 A1 | 4/2010 | Vaisanen |
| 2010/0110019 A1 | 5/2010 | Ozias et al. |
| 2010/0115455 A1 | 5/2010 | Kim |
| 2010/0123675 A1 | 5/2010 | Ippel |
| 2010/0134415 A1 | 6/2010 | Iwase et al. |
| 2010/0134423 A1 | 6/2010 | Brisebois et al. |
| 2010/0134424 A1 | 6/2010 | Brisebois et al. |
| 2010/0137027 A1 | 6/2010 | Kim |
| 2010/0149109 A1 | 6/2010 | Elias |
| 2010/0164878 A1 | 7/2010 | Bestle et al. |
| 2010/0164897 A1 | 7/2010 | Morin et al. |
| 2010/0164959 A1 | 7/2010 | Brown et al. |
| 2010/0169813 A1 | 7/2010 | Chang |
| 2010/0182247 A1 | 7/2010 | Petschnigg et al. |
| 2010/0182264 A1 | 7/2010 | Hahn et al. |

(56) References Cited

U.S. PATENT DOCUMENTS

| | | |
|---|---|---|
| 2010/0188371 A1 | 7/2010 | Lowles et al. |
| 2010/0201634 A1 | 8/2010 | Coddington |
| 2010/0213040 A1 | 8/2010 | Yeh et al. |
| 2010/0217428 A1 | 8/2010 | Strong et al. |
| 2010/0220900 A1 | 9/2010 | Orsley |
| 2010/0241973 A1 | 9/2010 | Whiddett |
| 2010/0245242 A1 | 9/2010 | Wu et al. |
| 2010/0245263 A1 | 9/2010 | Parada, Jr. et al. |
| 2010/0251112 A1 | 9/2010 | Hinckley et al. |
| 2010/0251189 A1 | 9/2010 | Jaeger |
| 2010/0262928 A1 | 10/2010 | Abbott |
| 2010/0283748 A1 | 11/2010 | Hsieh et al. |
| 2010/0295795 A1 | 11/2010 | Wilairat |
| 2010/0302712 A1 | 12/2010 | Wilairat |
| 2010/0306702 A1 | 12/2010 | Warner |
| 2010/0313124 A1 | 12/2010 | Privault et al. |
| 2010/0321326 A1 | 12/2010 | Grunthaner et al. |
| 2011/0012841 A1 | 1/2011 | Lin |
| 2011/0018821 A1 | 1/2011 | Kii |
| 2011/0041096 A1 | 2/2011 | Larco et al. |
| 2011/0043472 A1 | 2/2011 | Hada |
| 2011/0043475 A1 | 2/2011 | Rigazio et al. |
| 2011/0050594 A1 | 3/2011 | Kim et al. |
| 2011/0055729 A1 | 3/2011 | Mason et al. |
| 2011/0055753 A1 | 3/2011 | Horodezky et al. |
| 2011/0072036 A1 | 3/2011 | Agsen et al. |
| 2011/0107220 A1 | 5/2011 | Perlman |
| 2011/0115735 A1 | 5/2011 | Lev et al. |
| 2011/0115784 A1 | 5/2011 | Tartz et al. |
| 2011/0117526 A1 | 5/2011 | Wigdor et al. |
| 2011/0126094 A1 | 5/2011 | Horodezky et al. |
| 2011/0143769 A1 | 6/2011 | Jones et al. |
| 2011/0159915 A1 | 6/2011 | Yano et al. |
| 2011/0167092 A1 | 7/2011 | Subramaniam et al. |
| 2011/0167336 A1 | 7/2011 | Aitken et al. |
| 2011/0167350 A1 | 7/2011 | Hoellwarth |
| 2011/0167391 A1 | 7/2011 | Momeyer et al. |
| 2011/0169749 A1 | 7/2011 | Ganey et al. |
| 2011/0181524 A1 | 7/2011 | Hinckley |
| 2011/0185299 A1 | 7/2011 | Hinckley |
| 2011/0185300 A1 | 7/2011 | Hinckley |
| 2011/0185318 A1 | 7/2011 | Hinckley et al. |
| 2011/0185320 A1 | 7/2011 | Hinckley |
| 2011/0187647 A1 | 8/2011 | Woloszynski et al. |
| 2011/0191704 A1 | 8/2011 | Hinckley |
| 2011/0191718 A1 | 8/2011 | Hinckley |
| 2011/0191719 A1 | 8/2011 | Hinckley |
| 2011/0199386 A1 | 8/2011 | Dharwada et al. |
| 2011/0205163 A1 | 8/2011 | Hinckley |
| 2011/0209039 A1 | 8/2011 | Hinckley |
| 2011/0209057 A1 | 8/2011 | Hinckley |
| 2011/0209058 A1 | 8/2011 | Hinckley |
| 2011/0209088 A1 | 8/2011 | Hinckley |
| 2011/0209089 A1 | 8/2011 | Hinckley |
| 2011/0209093 A1 | 8/2011 | Hinckley et al. |
| 2011/0209097 A1 | 8/2011 | Hinckley |
| 2011/0209098 A1 | 8/2011 | Hinckley |
| 2011/0209099 A1 | 8/2011 | Hinckley |
| 2011/0209100 A1 | 8/2011 | Hinckley |
| 2011/0209101 A1 | 8/2011 | Hinckley |
| 2011/0209102 A1 | 8/2011 | Hinckley |
| 2011/0209103 A1 | 8/2011 | Hinckley |
| 2011/0209104 A1 | 8/2011 | Hinckley |
| 2011/0231796 A1 | 9/2011 | Vigil |
| 2011/0242039 A1 | 10/2011 | Kalis et al. |
| 2011/0242138 A1 | 10/2011 | Tribble |
| 2011/0261058 A1 | 10/2011 | Luo |
| 2011/0291948 A1 | 12/2011 | Stewart et al. |
| 2011/0291964 A1 | 12/2011 | Chambers et al. |
| 2011/0310459 A1 | 12/2011 | Gates et al. |
| 2012/0001861 A1 | 1/2012 | Townsend et al. |
| 2012/0032979 A1 | 2/2012 | Blow et al. |
| 2012/0075194 A1 | 3/2012 | Ferren |
| 2012/0084705 A1 | 4/2012 | Lee et al. |
| 2012/0096411 A1 | 4/2012 | Nash |
| 2012/0113007 A1 | 5/2012 | Koch et al. |
| 2012/0131454 A1 | 5/2012 | Shah |
| 2012/0154303 A1 | 6/2012 | Lazaridis et al. |
| 2012/0158629 A1 | 6/2012 | Hinckley et al. |
| 2012/0212445 A1 | 8/2012 | Heikkinen et al. |
| 2012/0236026 A1 | 9/2012 | Hinckley |
| 2012/0262407 A1 | 10/2012 | Hinckley et al. |
| 2012/0287076 A1 | 11/2012 | Dao et al. |
| 2012/0304133 A1 | 11/2012 | Nan et al. |
| 2012/0306788 A1 | 12/2012 | Chen et al. |
| 2012/0311476 A1 | 12/2012 | Campbell |
| 2012/0324384 A1 | 12/2012 | Cohen et al. |
| 2013/0038564 A1 | 2/2013 | Ho |
| 2013/0044070 A1 | 2/2013 | Townsend et al. |
| 2013/0063891 A1 | 3/2013 | Martisauskas |
| 2013/0088434 A1 | 4/2013 | Masuda |
| 2013/0093691 A1 | 4/2013 | Moosavi |
| 2013/0117715 A1 | 5/2013 | Williams et al. |
| 2013/0154999 A1 | 6/2013 | Guard |
| 2013/0181902 A1 | 7/2013 | Hinckley |
| 2013/0222287 A1 | 8/2013 | Bae et al. |
| 2013/0257768 A1 | 10/2013 | Lee et al. |
| 2013/0265269 A1 | 10/2013 | Sharma et al. |
| 2013/0271447 A1 | 10/2013 | Setlur |
| 2013/0275914 A1 | 10/2013 | Zhuo |
| 2013/0300668 A1 | 11/2013 | Churikov |
| 2013/0335453 A1 | 12/2013 | Lim et al. |
| 2014/0022183 A1 | 1/2014 | Ayoub et al. |
| 2014/0043265 A1 | 2/2014 | Chang et al. |
| 2014/0043277 A1 | 2/2014 | Saukko et al. |
| 2014/0092041 A1 | 4/2014 | Ih |
| 2014/0132551 A1 | 5/2014 | Bathiche |
| 2014/0192019 A1 | 7/2014 | Fukushima |
| 2014/0195957 A1 | 7/2014 | Bang |
| 2014/0253477 A1 | 9/2014 | Shim et al. |
| 2014/0289668 A1 | 9/2014 | Mavrody |
| 2014/0293145 A1 | 10/2014 | Jones et al. |
| 2014/0337791 A1 | 11/2014 | Agnetta et al. |
| 2015/0042588 A1 | 2/2015 | Park |
| 2015/0145797 A1 | 5/2015 | Corrion |
| 2015/0160849 A1 | 6/2015 | Weiss et al. |
| 2015/0227166 A1 | 8/2015 | Lee et al. |
| 2015/0261362 A1 | 9/2015 | King |
| 2015/0261364 A1 | 9/2015 | Cady et al. |
| 2016/0110024 A1 | 4/2016 | Townsend et al. |
| 2016/0283104 A1 | 9/2016 | Hinckley et al. |
| 2016/0291787 A1 | 10/2016 | Cady et al. |
| 2017/0131835 A1 | 5/2017 | Bathiche |
| 2017/0147148 A1 | 5/2017 | Townsend et al. |
| 2017/0177100 A1 | 6/2017 | Townsend et al. |

FOREIGN PATENT DOCUMENTS

| | | |
|---|---|---|
| CN | 1704888 | 12/2005 |
| CN | 1766824 | 5/2006 |
| CN | 1936799 | 3/2007 |
| CN | 101198925 | 6/2008 |
| CN | 201181467 | 1/2009 |
| CN | 101404687 | 4/2009 |
| CN | 101410781 | 4/2009 |
| CN | 101432677 | 5/2009 |
| CN | 101482790 | 7/2009 |
| CN | 101496404 | 7/2009 |
| CN | 201298220 | 8/2009 |
| CN | 101551728 | 10/2009 |
| CN | 101566865 | 10/2009 |
| CN | 101576789 | 11/2009 |
| CN | 101609383 | 12/2009 |
| CN | 101627361 | 1/2010 |
| CN | 101636711 | 1/2010 |
| CN | 101668056 | 3/2010 |
| CN | 102207788 | 10/2011 |
| EP | 0388344 B1 | 2/1995 |
| EP | 1942401 | 7/2008 |
| EP | 2081107 | 7/2009 |
| EP | 2148268 | 1/2010 |
| EP | 2466442 | 6/2012 |
| EP | 2261781 B1 | 10/2012 |
| EP | 2560088 | 2/2013 |

(56) References Cited

FOREIGN PATENT DOCUMENTS

| EP | 2634678 | 9/2013 |
|---|---|---|
| JP | 6282368 | 10/1994 |
| JP | 7281810 | 10/1995 |
| JP | 2001265523 | 9/2001 |
| JP | 2001290585 | 10/2001 |
| JP | 20020055753 | 2/2002 |
| JP | 2003195998 | 7/2003 |
| JP | 2005004690 | 1/2005 |
| JP | 2005026834 | 1/2005 |
| JP | 2005122271 | 5/2005 |
| JP | 2005149279 | 6/2005 |
| JP | 2007240964 | 9/2007 |
| JP | 3143462 | 7/2008 |
| JP | 2008532185 | 8/2008 |
| JP | 2008217742 | 9/2008 |
| JP | 2008305087 | 12/2008 |
| JP | 2009097724 | 4/2009 |
| JP | 2010019643 | 1/2010 |
| JP | 2010026834 | 2/2010 |
| JP | 2010250465 | 11/2010 |
| KR | 20090013927 | 2/2009 |
| KR | 1020090088501 | 8/2009 |
| KR | 20090106755 | 10/2009 |
| TW | 200921478 | 5/2009 |
| TW | 200947297 | 11/2009 |
| TW | 200951783 | 12/2009 |
| WO | WO 9928812 | 1/1999 |
| WO | WO 2009086628 | 7/2009 |
| WO | WO 2009131987 | 10/2009 |
| WO | WO 2011106467 | 9/2011 |
| WO | WO 2011106468 | 9/2011 |

OTHER PUBLICATIONS

"Apple Unibody MacBook Pro #MB991LL/A 2.53 GHz Intel Core 2 Duo", Retrieved from: <http://www.themacstore.com/parts/show/c-nmb3-mb9911l_a> on Nov. 10, 2009, (2009), 12 pages.
"Foreign Notice of Allowance", CN Application No. 201110046519.X, dated Aug. 2, 2016, 4 pages.
"In touch with new opportunities—Dispersive Signal Technology", Datasheet [online], NXT [retrieved Nov. 28, 2005], Retrieved from the Internet <URL: http://www.nxtsound.com/index.php?id=402>, 2 pgs.
"In touch with new opportunities—Dispersive Signal Technology", DataSheet, NXT, (2005), 1 page.
"iQuery & Css Example—Dropdown Menu", DesignReviver, Retrieved from: <http://designreviver.com/tutorials/jquery-css-example-dropdown-menu/> on Nov. 22, 2011,(Oct. 7, 2008), 30 pages.
"New MS Courier Leak Details Multi-Touch Interface", Retrieved from: <htt12://www.electronista.com/articles/09/11/04/courier.gestures.ui.explained/> on Nov. 10, 2009, (Nov. 4, 2009), 9 pages.
"Touch Screen is available in .36-50.8 mm thickness", ThomasNet Industrial News Room, (Jul. 29, 2003), 2 pages.
"UI Guidelines", Retrieved from: http://na.blackberry.com/eng/deliverables/6622/BlackBerry_Smartphones-US. pdf., 76 pages.
3M Touch Systems, Inc. Announces Shipment of Dispersive Signal Technology Product. Datasheet [ online]. 3M Corporation, [retrieved Nov. 28, 2005]. Retrieved from the Internet <URL: http://www.3m.com/3mtouchsystems/Corporate/News/DST_090605.jhml>, pp. 1-3.
3M Touch Systems, Inc. Announces Shipment of Dispersive Signal Technology Product, Datasheet, 3M Corporation, retrieved from <http://solutions p.3m.com/wps/portal/3M/en_US/TouchSystems/TouchScreen/Informatio/Media/PressReleases/Archive/?PC_7_RJH9U52300FA602N9RSR991013000000assetId=1114287537178», (Sep. 6, 2005), 3 pages.
3M Touch Ware TM Software for Windows User Guide, in White Paper of 3M Touch Systems, Aug. 9, 2013, online at: http://multimedia.3m.com/mws/mediawebserver?6666660Zjcf6IVs6EVs66SS0LCOrrrrQ-, pp. 1-65.

AccuScribe Touchscreens, Datasheet Elo TouchSvstem, (Aug. 2005), 2 pages.
AccuScribe Touchscreens. Datasheet [online]. Elo TouchSystem, [retrieved Nov. 28, 2005]. Retrieved from the Internet <URL: http://www.touchscreen.com.hk/scribe.htm>, 2 pgs.
Advisory Action, U.S. Appl. No. 12/709,376, dated Dec. 19, 2013, 2 pages.
Appleinsider, "Special Report: Apple's Touch-Sensitive iPod Ambitions Disclosed in Filing", Retrieved from: <http://www.appleinsider.com/articles/06/10/26/special_report_apples_touch_sensitive_ip_od_ambitions_disclosed_in_filing.html> on Nov. 11, 2009 (Oct. 26, 2006), 10 pages.
Boudreaux, Toby "Touch Patterns: Chapter 6—Programming the iPhone User Experience", retrieved from <http://oreilly.com/iphone/excerpts/iphone-programming-user/touch-patterns.html> on Oct. 25, 2011, 12 pages.
Brandl, Peter et al., "Combining and Measuring the Benefits of Bimanual Pen and Direct-Touch Interaction on Horizontal Interfaces", Retrieved from: <http://www.merl.com/papers/docs/TR2008-054.pdf> on Nov. 5, 2009, Mitsubishi Electric Research Laboratories, (May 2008), 9 pages.
Chinese Foreign Office Action in Application 201380059094.3, dated Dec. 1, 2016, 15 pgs.
Corrected Notice of Allowance, U.S. Appl. No. 14/212,916, dated Mar. 3, 2016, 2 pages.
Corrected Notice of Allowance, U.S. Appl. No. 14/212,916, dated May 9, 2016, 2 pages.
Corrected Notice of Allowance, U.S. Appl. No. 14/212,916, dated May 26, 2016, 6 pages.
Daniels, Martyn "Brave New World", Retrieved from: <http://booksellerassociation.blogspot.com/2009_03_01_archive.html> on Nov. 10, 2009 (Mar. 2009), 54 pages.
Decision on Reexamination, CN Application No. 201110044285.5, dated Mar. 26, 2015, 13 pages.
Dell and Windows 7—"The Wait Is Over", Retrieved from: <http://content.dell .com/us/en/corp/d/press-releases/2009-10-22-Dell-and-Windows-7.aspx> on Nov. 10, 2009, (Oct. 22, 2009), 2 pages.
Elliott, Matthew "First Dell, Then HP: What's Next for N-trig's Multitouch Screen Technology", Retrieved from: <http://news.cnet.com/8301-17938_105-10107886-1. html>, on Nov. 11, 2009, (Nov. 25, 2008), 5 pages.
Emigh, Jacqueline "Lenovo Launches Windows 7 ThinkPads with Multitouch and Outdoor Screens", Retrieved from: <http://www.betanews.com/article/Lenovo-launches-Windows-7-ThinkPads-with-multitouch-and-outdoor-screens/1253017166> on Nov. 11, 2009, (Sep. 15, 2009), 3 pages.
Ex Parte Mewherter, PTAB precedential decision, U.S. Appl. No. 10/685,192, May 8, 2013, 22 pages.
Final Office Action, U.S. Appl. No. 12/472,699, (dated Jul. 29, 2013), 12 pages.
Final Office Action, U.S. Appl. No. 12/472,699, (dated Feb. 15, 2012), 12 pages.
Final Office Action, U.S. Appl. No. 12/695,842, dated Feb. 12, 2015, 21 pages.
Final Office Action, U.S. Appl. No. 12/695,842, dated Dec. 2, 2013, 17 pages.
Final Office Action, U.S. Appl. No. 12/695,937, (dated Jul. 26, 2012), 13 pages.
Final Office Action, U.S. Appl. No. 12/695,937, dated Apr. 2, 2015, 14 pages.
Final Office Action, U.S. Appl. No. 12/695,937, dated Nov. 10, 2014, 13 pages.
Final Office Action, U.S. Appl. No. 12/695,976, (dated Nov. 21, 2012), 10 pages.
Final Office Action, U.S. Appl. No. 12/695,976, dated Jul. 23, 2014, 12 pages.
Final Office Action, U.S. Appl. No. 12/700,357, (dated Oct. 24, 2012), 13 pages.
Final Office Action, U.S. Appl. No. 12/700,357, dated Nov. 20, 2014, 13 pages.
Final Office Action, U.S. Appl. No. 12/700,460, (dated Aug. 28, 2012), 26 pages.

(56) References Cited

OTHER PUBLICATIONS

Final Office Action, U.S. Appl. No. 12/700,510, (dated Oct. 10, 2012), 23 pages.
Final Office Action, U.S. Appl. No. 12/700,510, dated Feb. 3, 2015, 30 pages.
Final Office Action, U.S. Appl. No. 12/709,204, (dated Oct. 3, 2012), 24 pages.
Final Office Action, U.S. Appl. No. 12/709,204, dated Jan. 12, 2015, 29 pages.
Final Office Action, U.S. Appl. No. 12/709,204, dated Apr. 11, 2014, 25 pages.
Final Office Action, U.S. Appl. No. 12/709,204, dated Sep. 12, 2013, 24 pages.
Final Office Action, U.S. Appl. No. 12/709,245, (dated Mar. 15, 2013), 16 pages.
Final Office Action, U.S. Appl. No. 12/709,245, (dated Jan. 6, 2012), 13 pages.
Final Office Action, U.S. Appl. No. 12/709,245, dated Nov. 14, 2014, 6 pages.
Final Office Action, U.S. Appl. No. 12/709,282, (dated Dec. 24, 2012), 11 pages.
Final Office Action, U.S. Appl. No. 12/709,282, (dated Jul. 16, 2013), 11 pages.
Final Office Action, U.S. Appl. No. 12/709,282, dated May 9, 2014, 17 pages.
Final Office Action, U.S. Appl. No. 12/709,301, (dated Jan. 7, 2013), 14 pages.
Final Office Action, U.S. Appl. No. 12/709,301, (dated Sep. 3, 2013), 12 pages.
Final Office Action, U.S. Appl. No. 12/709,301, (dated Mar. 1, 2012), 11 pages.
Final Office Action, U.S. Appl. No. 12/709,348, (dated Jan. 7, 2013), 15 pages.
Final Office Action, U.S. Appl. No. 12/709,348, (dated Feb. 17, 2012), 13 pages.
Final Office Action, U.S. Appl. No. 12/709,348, dated Sep. 12, 2013, 11 pages.
Final Office Action, U.S. Appl. No. 12/709,376, (dated Nov. 8, 2012), 20 pages.
Final Office Action, U.S. Appl. No. 12/709,376, (dated Mar. 30, 2012), 16 pages.
Final Office Action, U.S. Appl. No. 12/709,376, dated Sep. 10, 2013, 12 pages.
Final Office Action, U.S. Appl. No. 12/713,053, (dated Aug. 17, 2012), 10 pages.
Final Office Action, U.S. Appl. No. 12/713,081, (dated May 9, 2012), 19 pages.
Final Office Action, U.S. Appl. No. 12/713,096, (dated Feb. 15, 2013), 8 pages.
Final Office Action, U.S. Appl. No. 12/713,110, (dated Jan. 17, 2013), 10 pages.
Final Office Action, U.S. Appl. No. 12/713,113, (dated Jun. 4, 2012), 18 pages.
Final Office Action, U.S. Appl. No. 12/713,113, dated Oct. 8, 2013, 21 pages.
Final Office Action, U.S. Appl. No. 12/713,113, dated Oct. 8, 2014, 13 pages.
Final Office Action, U.S. Appl. No. 12/713,118, (dated Oct. 26, 2012), 10 pages.
Final Office Action, U.S. Appl. No. 12/713,127, (dated Jun. 6, 2012), 18 pages.
Final Office Action, U.S. Appl. No. 12/713,127, dated Aug. 14, 2014, 16 pages.
Final Office Action, U.S. Appl. No. 12/713,130, (dated Jun. 29, 2012), 8 pages.
Final Office Action, U.S. Appl. No. 12/713,133, (dated May 20, 2013), 10 pages.
Final Office Action, U.S. Appl. No. 12/713,133, (dated Jul. 2, 2012), 8 pages.
Final Office Action, U.S. Appl. No. 13/352,193, dated Jan. 12, 2015, 22 pages.
Final Office Action, U.S. Appl. No. 13/352,193, dated May 23, 2014, 24 pages.
Final Office Action, U.S. Appl. No. 13/484,075, (dated May 21, 2013),10 pages.
Final Office Action, U.S. Appl. No. 13/484,075, dated Feb. 4, 2015, 13 pages.
Final Office Action, U.S. Appl. No. 13/898,452, dated Mar. 10, 2016, 25 pages.
Final Office Action, U.S. Appl. No. 13/898,452, dated Mar. 27, 2015, 23 pages.
Final Office Action, U.S. Appl. No. 13/898,452, dated Jun. 9, 2014, 26 pages.
Final Office Action, U.S. Appl. No. 14/099,798, dated Nov. 25, 2015, 19 pages.
Findlater, et al., "Personalized Input: Improving Ten-Finger Touch-screen Typing through Automatic Adaptation", Proceedings of the SIGCHI Conference on Human Factors in Computing Systems, Available at <http://terpconnect.umd.edu/~leahkf/pubs/CHI2012-findlater-PersonalizedTyping.pdf>, (May 5, 2012), 10 pages.
Fonseca, "New Apple Patent Hints at Touch Enabled Bezels for Future Devices", Retrieved from: <http://vr-zone.com/articles/new-apple-patent-hints-at-touch-enabledbezels-for-futuredevices/42928.html?utm_source=rss&utm_medium=rss&utm_campaign=new-apple-patent-hints-at-touch-enabled-bezels-for-future-devices> Jan. 31, 2014, Jul. 3, 2013, 6 pages.
Foreign Notice of Allowance, CN Application No. 201110046510.9, dated Feb. 12, 2015, 6 pages.
Foreign Notice of Allowance, CN Application No. 201110050506.X, dated Nov. 2, 2014, 4 pages.
Foreign Notice of Allowance, JP Application No. 2012-555062, dated Mar. 3, 2015, 3 pages.
Foreign Office Action, Chinese Application No. 201110044285.5, (dated Jan. 4, 2013), 13 pages.
Foreign Office Action, Chinese Application No. 201110046510.9, (dated May 31, 2013), 11 pages.
Foreign Office Action, Chinese Application No. 201110046519.X, (dated Mar. 19, 2013), 12 pages.
Foreign Office Action, Chinese Application No. 201110046519.X, (dated Aug. 2, 2012), 13 pages.
Foreign Office Action, Chinese Application No. 201110046519.X, (dated Aug. 6, 2013), 11 pages.
Foreign Office Action, Chinese Application No. 201110046529.3, (dated Feb. 4, 2013), 9 pages.
Foreign Office Action, Chinese Application No. 201110046529.3, (dated Aug. 16, 2012), 14 pages.
Foreign Office Action, Chinese Application No. 201110046529.3, (dated Aug. 6, 2013), 10 pages.
Foreign Office Action, Chinese Application No. 201110050499.3, (dated Nov. 27, 2012), 8 pages.
Foreign Office Action, Chinese Application No. 201110050499.3, (dated Aug. 3, 2012), 8 pages.
Foreign Office Action, Chinese Application No. 201110050506.X, (dated Apr. 2, 2013), 11 pages.
Foreign Office Action, Chinese Application No. 201110050508.9, (dated Mar. 7, 2013), 8 pages.
Foreign Office Action, Chinese Application No. 201110050508.9, (dated Aug. 3, 2012), 8 pages.
Foreign Office Action, Chinese Application No. 201110050852.8, (dated Mar. 26, 2013), 10 pages.
Foreign Office Action, CN Application No. 201110044285.5, dated Dec. 22, 2014, 8 pages.
Foreign Office Action, CN Application No. 201110046510.9, dated Feb. 12, 2014, 9 pages.
Foreign Office Action, CN Application No. 201110046510.9, dated Jul. 25, 2014, 10 pages.
Foreign Office Action, CN Application No. 201110046519.X, dated Sep. 21, 2015, 16 Pages.
Foreign Office Action, CN Application No. 201110050506.X, dated Feb. 26, 2014, 6 pages.
Foreign Office Action, CN Application No. 201110050852.8, dated Nov. 1, 2013, 8 pages.

(56) References Cited

OTHER PUBLICATIONS

Foreign Office Action, CN Application No. 201180007100.1, dated May 15, 2015, 19 Pages.
Foreign Office Action, CN Application No. 201180007100.1, dated Sep. 10, 2014, 22 pages.
Foreign Office Action, CN Application No. 201180009579.2, dated Sep. 6, 2015, 19 pages.
Foreign Office Action, CN Application No. 201180009579.2, dated Nov. 4, 2014, 16 pages.
Foreign Office Action, CN Application No. 201180010692.2, dated Mar. 10, 20105, 8 pages.
Foreign Office Action, CN Application No. 201180010692.2, dated Jun. 26, 2014, 13 pages.
Foreign Office Action, CN Application No. 201180010769.6, dated Sep. 3, 2014, 12 pages.
Foreign Office Action, CN Application No. 201180011020.3, dated Jan. 15, 2015, 8 pages.
Foreign Office Action, CN Application No. 201180011020.3, dated May 4, 2014, 12 pages.
Foreign Office Action, CN Application No. 201180011039.8, dated Feb. 17, 2015, 15 pages.
Foreign Office Action, CN Application No. 201180011039.8, dated Jun. 5, 2014, 16 pages.
Foreign Office Action, European Patent Application No. 11747907. 1, (dated Jan. 28, 2013), 5 pages.
Foreign Office Action, European Patent Application No. 11748026. 9, (dated Jan. 16, 2013), 5 pages.
Foreign Office Action, European Patent Application No. 11748027. 7, (dated Jan. 18, 2013), 5 pages.
Foreign Office Action, European Patent Application No. 11748028. 5, (dated Jan. 28, 2013), 5 pages.
Foreign Office Action, European Patent Application No. 11748029. 3, (dated Jan. 16, 2013), 5 pages.
Foreign Office Action, JP Application No. 2012-554008, dated Jun. 25, 2015, 13 pages.
Foreign Office Action, JP Application No. 2012-554008, dated Nov. 25, 2014, 7 pages.
Foreiqn Office Action, Chinese Application 201110044285.5 (dated Jun. 20, 2012), 12 pages.
Foreiqn Office Action, Chinese Application 201110044285.5, (dated Apr. 24, 2013), 8 pages.
Goel, et al., "GripSense: Using Built-in Sensors to Detect Hand Posture and Pressure on Commodity Mobile Phones", Proceedings of the 25th Annual ACM Symposium on User Interface Software and Technology, (Oct. 7, 2012), pp. 545-554.
Gross, Mark D., "Stretch-a-Sketch: A Dynamic Diagrammer", IEEE Symposium on Visual Languages, Available at <http://depts.washington.edu/dmachine/PAPER/VL94/vl.html>,(Oct. 1994), 11 pages.
Hinckley, Ken et al., "Codex: A Dual Screen Tablet Computer", Conference on Human Factors in Computing Systems, (Apr. 9, 2009), 10 pages.
Hinckley, Ken et al., "Sensor Synaesthesia: Touch in Motion, and Motion in Touch", CHI 2011, May 7-12, 2011, available at <http://research.microsoft.com/en-us/um/people/kenh/papers/touch-motion-camera-ready-final.pdf>, (May 7, 2011), 10 pages.
Hinckley, Ken et al., "Stitching: Pen Gestures that Span Multiple Displays", CHI 2004, Available at <http://www.cs.cornell.edu/~francois/Papers/2004-Hinckley-AVI04-Stitching.>,(2004), pp. 1-8.
Hirche, et al., "Adaptive Interface for Text Input on Large-Scale Interactive Surfaces", 3rd IEEE International Workshop on Horizontal Interactive Human Computer System, (Oct. 1, 2008), pp. 153-156.
Hotelling, "Multi-functional hand-held device", U.S. Appl. No. 60/658,777, filed Mar. 4, 2015, 117 pages.
Hotelling, "Multi-functional hand-held device", U.S. Appl. No. 60/663,345, filed Mar. 16, 2005, 76 pages.
International Preliminary Report on Patentability, Application No. PCT/US2014/067804, dated Feb. 22, 2016, 9 pages.
Kearney, Paul, "The PDA Challenge—Met by the AD7873 Resistive-Touch-Screen Controller ADC", in Error processing SSI file vol. 35, No. 4, online at: http://www.analog.com/library/analogdialogue/archives/35-04/touchscreen/, Aug. 2001, 5 pgs.
Kim, et al., "Hand Grip Pattern Recognition for Mobile User Interfaces", Interaction Lab/Samsung Advanced Institute of Technology, Available at <http://www.alice.org/stage3/pubs/uistsensing.pdf>,2006, pp. 1789-1794.
Krazit, Tom, "Has Apple Found the Magic Touch?", Retrieved from: <http://news.cnet.com/8301-13579_3-9879471-37. html> on Nov. 10, 2009, (Feb. 26, 2008), 2 pages.
Lee, Tyler "The TypeWay iPad app is an adaptive on-screen keyboard", Retrieved from <http://www.ubergizmo.com/2012/02/the-typeway-ipad-app-is-an-adaptive-onscreen-keyboard/> on Mar. 7, 2013, (Feb. 1, 2012), 2 pages.
Maxwell, Kenneth G., "Writing drivers for common touch-screen interface hardware", Industrial Control Design Line, (Jun. 15, 2005), 9 pages.
Maxwell, Kenneth G., "Writing drivers for common touch-screen interface hardware", Industrial Control Design Line, Jun. 15, 2005, [online], [retrieved Nov. 28, 2005]. Retrieved from the Internet <URL: http://www.industrialcontroldesignline.com/howto/164900930>, 15 pgs.
Minsky, Margaret R., "Manipulating Simulated Objects with Real-world Gestures using a Force and Position Sensitive Screen", Computer Graphics. vol. 18. No. 3., Available at <http://delivery.acm.org/10.1145/810000/808598/p195-minsky.pdf?key1=808598&key2=2244955521&coll=GUIDE&dl=GUIDE&CFID=57828830&CFTOKEN=43421964>, (Jul. 1984), pp. 195-203.
Moore, Charles "TypeWay Adaptive Keyboard for iPad Review", Retrieved from <http://www.technologytell.com/apple/89378/typeway-adaptive-keyboard-for-ipadreview/> on Mar. 6, 2013, (Feb. 5, 2012), 10 pages.
Nick T., "Smartphone displays need a bezel. Here's why", Retrieved at «http://www.phonearena.com/news/Smartphone-displays-need-a-bezel.-Heres-why_id27670», Mar. 12, 2012, 4 pgs.
Non-Final Office Action, U.S. Appl. No. 12/472,699, (dated Mar. 28, 2013), 10 pages.
Non-Final Office Action, U.S. Appl. No. 12/472,699, (dated Sep. 12, 2011), 12 pages.
Non-Final Office Action, U.S. Appl. No. 12/472,699, dated Oct. 23, 2013, 14 pages.
Non-Final Office Action, U.S. Appl. No. 12/695,842, (dated May 22, 2013), 16 pages.
Non-Final Office Action, U.S. Appl. No. 12/695,842, (dated Oct. 3, 2012), 16 pages.
Non-Final Office Action, U.S. Appl. No. 12/695,842, dated Aug. 18, 2014, 22 pages.
Non-Final Office Action, U.S. Appl. No. 12/695,937, (dated Apr. 25, 2012), 14 pages.
Non-Final Office Action, U.S. Appl. No. 12/695,937, dated May 7, 2014, 12 pages.
Non-Final Office Action, U.S. Appl. No. 12/695,976, (dated Sep. 11, 2012), 8 pages.
Non-Final Office Action, U.S. Appl. No. 12/695,976, dated Mar. 25, 2015, 11 pages.
Non-Final Office Action, U.S. Appl. No. 12/700,357, (dated Jul. 2, 2012), 10 pages.
Non-Final Office Action, U.S. Appl. No. 12/700,357, dated Apr. 2, 2015, 13 pages.
Non-Final Office Action, U.S. Appl. No. 12/700,357, dated Jun. 26, 2014, 12 pages.
Non-Final Office Action, U.S. Appl. No. 12/700,460, (dated Jan. 13, 2012), 21 pages.
Non-Final Office Action, U.S. Appl. No. 12/700,510, (dated Feb. 7, 2012), 20 pages.
Non-Final Office Action, U.S. Appl. No. 12/700,510, dated Jun. 12, 2014, 29 pages.
Non-Final Office Action, U.S. Appl. No. 12/709,376 (dated Jan. 23, 2012), 14 pages.
Non-Final Office Action, U.S. Appl. No. 12/709,204, (dated Jun. 6, 2013), 27 pages.

(56) References Cited

OTHER PUBLICATIONS

Non-Final Office Action, U.S. Appl. No. 12/709,204, (dated May 10, 2012), 20 pages.
Non-Final Office Action, U.S. Appl. No. 12/709,204, dated Aug. 13, 2014, 26 pages.
Non-Final Office Action, U.S. Appl. No. 12/709,204, dated Nov. 20, 2013, 31 pages.
Non-Final Office Action, U.S. Appl. No. 12/709,245, (dated May 30, 2013), 15 pages.
Non-Final Office Action, U.S. Appl. No. 12/709,245, (dated Nov. 30, 2011), 11 pages.
Non-Final Office Action, U.S. Appl. No. 12/709,245, (dated Mar. 21, 2012), 13 pages.
Non-Final Office Action, U.S. Appl. No. 12/709,245, dated Mar. 20, 2014, 16 pages.
Non-Final Office Action, U.S. Appl. No. 12/709,282, (dated Feb. 28, 2013), 11 pages.
Non-Final Office Action, U.S. Appl. No. 12/709,282, (dated Apr. 12, 2012), 9 pages.
Non-Final Office Action, U.S. Appl. No. 12/709,282, dated Jan. 29, 2015, 23 pages.
Non-Final Office Action, U.S. Appl. No. 12/709,282, dated Oct. 10, 2013, 12 pages.
Non-Final Office Action, U.S. Appl. No. 12/709,301, (dated May 14, 2013), 14 pages.
Non-Final Office Action, U.S. Appl. No. 12/709,301, (dated Nov. 28, 2011 ), 9 pages.
Non-Final Office Action, U.S. Appl. No. 12/709,301, (dated Sep. 13, 2012), 13 pages.
Non-Final Office Action, U.S. Appl. No. 12/709,301, dated Jan. 16, 2015, 5 pages.
Non-Final Office Action, U.S. Appl. No. 12/709,301, dated May 23, 2014, 12 pages.
Non-Final Office Action, U.S. Appl. No. 12/709,301, dated Jul. 14, 2015, 11 pages.
Non-Final Office Action, U.S. Appl. No. 12/709,301, dated Oct. 24, 2013, 11 pages.
Non-Final Office Action, U.S. Appl. No. 12/709,301, dated Nov. 19, 2015, 8 pages.
Non-Final Office Action, U.S. Appl. No. 12/709,348, (dated Apr. 25, 2013), 15 pages.
Non-Final Office Action, U.S. Appl. No. 12/709,348, (dated Dec. 7, 2011),12 pages.
Non-Final Office Action, U.S. Appl. No. 12/709,348, (dated Aug. 2, 2012), 14 pages.
Non-Final Office Action, U.S. Appl. No. 12/709,348, dated Dec. 20, 2013, 9 pages.
Non-Final Office Action, U.S. Appl. No. 12/709,376, (dated May 23, 2013),17 pages.
Non-Final Office Action, U.S. Appl. No. 12/709,376, (dated Aug. 17, 2012), 17 pages.
Non-Final Office Action, U.S. Appl. No. 12/713,053, (dated Nov. 23, 2012), 13 pages.
Non-Final Office Action, U.S. Appl. No. 12/713,053, (dated Feb. 3, 2012), 8 pages.
Non-Final Office Action, U.S. Appl. No. 12/713,081, (dated Nov. 29, 2012), 9 pages.
Non-Final Office Action, U.S. Appl. No. 12/713,081, (dated Dec. 23, 2011), 18 pages.
Non-Final Office Action, U.S. Appl. No. 12/713,096, (dated Jun. 26, 2013), 8 pages.
Non-Final Office Action, U.S. Appl. No. 12/713,096, (dated Jun. 6, 2012), 9 pages.
Non-Final Office Action, U.S. Appl. No. 12/713,096, dated Jan. 30, 2014, 23 pages.
Non-Final Office Action, U.S. Appl. No. 12/713,110, (daed May 3, 2013), 10 pages.
Non-Final Office Action, U.S. Appl. No. 12/713,110, (dated Jun. 21, 2012), 7 pages.
Non-Final Office Action, U.S. Appl. No. 12/713,113, (dated Apr. 23, 2013), 18 pages.
Non-Final Office Action, U.S. Appl. No. 12/713,113, (dated Dec. 22, 2011 ), 20 pages.
Non-Final Office Action, U.S. Appl. No. 12/713,113, dated Feb. 12, 2015, 26 pages.
Non-Final Office Action, U.S. Appl. No. 12/713,113, dated Jun. 4, 2014, 12 pages.
Non-Final Office Action, U.S. Appl. No. 12/713,118, (dated Jun. 8, 2012), 7 pages.
Non-Final Office Action, U.S. Appl. No. 12/713,118, dated Jan. 29, 2015, 12 pages.
Non-Final Office Action, U.S. Appl. No. 12/713,127, (dated Dec. 27, 2011), 22 pages.
Non-Final Office Action, U.S. Appl. No. 12/713,127, dated Jan. 31, 2014, 21 pages.
Non-Final Office Action, U.S. Appl. No. 12/713,127, dated Mar. 26, 2015, 19 pages.
Non-Final Office Action, U.S. Appl. No. 12/713,130, (dated Jan. 16, 2013), 5 pages.
Non-Final Office Action, U.S. Appl. No. 12/713,130, (dated Jan. 23, 2012), 7 pages.
Non-Final Office Action, U.S. Appl. No. 12/713,133, (dated Jan. 14, 2013), 8 pages.
Non-Final Office Action, U.S. Appl. No. 12/713,133, (dated Jan. 31, 2012), 7 pages.
Non-Final Office Action, U.S. Appl. No. 12/713,133, dated Dec. 10, 2013, 8 pages.
Non-Final Office Action, U.S. Appl. No. 13/352,193, dated Jan. 31, 2014, 23 pages.
Non-Final Office Action, U.S. Appl. No. 13/352,193, dated Apr. 9, 2015, 21 pages.
Non-Final Office Action, U.S. Appl. No. 13/352,193, dated Aug. 20, 2014, 20 pages.
Non-Final Office Action, U.S. Appl. No. 13/484,075, (dated Jan. 15, 2013), 9 pages.
Non-Final Office Action, U.S. Appl. No. 13/484,075, dated Sep. 5, 2014, 12 pages.
Non-Final Office Action, U.S. Appl. No. 13/898,452, dated Feb. 24, 2014, 24 pages.
Non-Final Office Action, U.S. Appl. No. 13/898,452, dated Jul. 28, 2016, 26 pages.
Non-Final Office Action, U.S. Appl. No. 13/898,452, dated Sep. 14, 2015, 23 pages.
Non-Final Office Action, U.S. Appl. No. 13/898,452, dated Sep. 26, 2014, 21 pages.
Non-Final Office Action, U.S. Appl. No. 14/099,798, dated Mar. 31, 2016, 18 pages.
Non-Final Office Action, U.S. Appl. No. 14/099,798, dated Jun. 9, 2015, 15 pages.
Non-Final Office Action, U.S. Appl. No. 14/145,204, dated Feb. 24, 2015, 10 pages.
Non-Final Office Action, U.S. Appl. No. 14/212,916, dated Aug. 7, 2015, 10 pages.
Nordgren, Peder "Development of a Touch Screen Interface for Scania Interactor", Master's Thesis in Computing Science, UMEA University, Available at <http://www.cs.umu.se/education/examina/Rapporter/PederNordgren.pdf>, (Apr. 10, 2007), pp. 1-59, (66 pgs. all together).
Notice of Allowance, U.S. Appl. No. 11/324,157, (dated May 9, 2011 ), 8 pages.
Notice of Allowance, U.S. Appl. No. 12/472,699, dated May 2, 2014, 7 pages.
Notice of Allowance, U.S. Appl. No. 12/695,064, (dated Mar. 28, 2012),12 pages.
Notice of Allowance, U.S. Appl. No. 12/695,959, (dated Apr. 17, 2012),13 pages.
Notice of Allowance, U.S. Appl. No. 12/709,245, dated Jan. 30, 2015, 5 pages.
Notice of Allowance, U.S. Appl. No. 12/709,245, dated Apr. 28, 2015, 5 pages.
Notice of Allowance, U.S. Appl. No. 12/709,301, dated Feb. 24, 2016, 7 pages.

(56) References Cited

OTHER PUBLICATIONS

Notice of Allowance, U.S. Appl. No. 12/709,301, dated Sep. 8, 2015, 6 pages.
Notice of Allowance, U.S. Appl. No. 12/709,376, dated Mar. 17, 2014, 8 pages.
Notice of Allowance, U.S. Appl. No. 12/713,053, (dated Jun. 7, 2013), 7 pages.
Notice of Allowance, U.S. Appl. No. 12/713,096, dated Jan. 9, 2015, 16 pages.
Notice of Allowance, U.S. Appl. No. 12/713,096, dated Aug. 29, 2014, 16 pages.
Notice of Allowance, U.S. Appl. No. 12/713,110, dated Dec. 4, 2013, 13 pages.
Notice of Allowance, U.S. Appl. No. 12/713,118, dated Mar. 5, 2015, 5 pages.
Notice of Allowance, U.S. Appl. No. 12/713,130, (dated Feb. 19, 2013), 5 pages.
Notice of Allowance, U.S. Appl. No. 12/713,133, dated Jan. 17, 2014, 4 pages.
Notice of Allowance, U.S. Appl. No. 14/212,916, dated Dec. 24, 2015, 8 pages.
Notice on Reexamination, CN Application No. 201110044285.5, dated Jul. 23, 2014, 7 pages.
Olwal, Alex et al., "Rubbing and Tapping for Precise and Rapid Selection on Touch-Screen Displays", Conference on Human Factors in Computing Systems, Available at <http://www.csc.kth.se/~alx/projects/research/rubbing/olwal_rubbing_tapping_chi_2008.pdf>, (Apr. 2008), 10 pages.
Panzarino, Matthew., "Apple's iPad Mini Should have a Widescreen Display", Retrieved at «http://thenextweb.com/apple/2012/08/15/what-ipad-mini-169-instead-43/», Aug. 15, 2012, 6 pgs.
PCT International Search Report and Written Opinion, Application No. PCT/US2014/067804, dated Jul. 24, 2015, 19 Pages.
PCT International Search Report and Written Opinion, Application No. PCT/US2015/019811, dated Jul. 8, 2015, 11 pages.
PCT International Search Report in International Application PCT/US2013/069644, dated Jan. 8, 2014, 11 pgs.
PCT Search Report and Written Opinion, Application No. PCT/US/2011/025972, (dated Sep. 30, 2011), 14 pages.
PCT Search Report and Written Opinion, Application No. PCT/US2011/020410, (dated Sep. 27, 2011 ), 9 pages.
PCT Search Report and Written Opinion, Application No. PCT/US2011/020412, (dated Aug. 31, 2011), 9 pages.
PCT Search Report and Written Opinion, Application No. PCT/US2011/025131, (dated Oct. 31, 2011), 10 pgs.
PCT Search Report and Written Opinion, Application No. PCT/US2011/025132, (dated Oct. 26, 2011),10 paqes.
PCT Search Report and Written Opinion, Application No. PCT/US2011/025575, (dated Sep. 30, 2011), 14 pages.
PCT Search Report and Written Opinion, Application No. PCT/US2011/025971, (dated Oct. 31, 2011), 15 pages.
PCT Search Report and Written Opinion, Application No. PCT/US2011/025973, (dated Oct. 27, 2011), 13 paqes.
PCT Search Report and Written Opinion, Application No. PCT/US2011/025974, (dated Oct. 26, 2011 ), 8 pages.
PCT Search Report and Written Opinion, Application No. PCT/US2013/020413, (dated Apr. 8, 2013), 10 pages.
PCT Second Written Opinion, Application No. PCT/US2014/067804, dated Nov. 24, 2015, 8 Pages.
Pierce, Jeffrey S., et al., "Toolspaces and Glances: Storing, Accessing, and Retrieving Objects in 3D Desktop Applications", 1999 Symposium on Interactive 3D Graphics. Available at <http://delivery.acm.org/10.1145/310000/300545/p163-pierce.pdf?key1=300545&key2=8792497521&coll=GUIDE&dl=GUIDE&CFID=61004073&CFTOKEN=28819248>,(Apr. 1999), pp. 163-168.
Roth, et al., "Bezel Swipe: Conftict-Free Scrolling and Multiple Selection on Mobile Touch Screen Devices", Retrieved at «http://www.volkerroth.com/download/Roth2009a.pdf», in 27th International Conference on Human Factors in Computing Systems, Apr. 4, 2009, 4 pgs.
Roudaut, et al., "Leaf Menus: Linear Menus with Stroke Shortcuts for Small Handheld Devices", Proceedings of the 12th IFIP TC 13 International Conference on Human-Computer Interaction: Part 1, Aug. 2009, 4 pages.
Saini, Kalpana et al., "Designing of a Virtual System with Fingerprint Security by considering many Security Threats", International Journal of Computer Applications, vol. 3—No. 2. available at <http://www.ijcaonline.org/volume3/number2/pxc387995.pdf>, (Jun. 2010), pp. 25-31.
Sajid, Uzair "Microsoft Patent a Futuristic Virtual Multitouch Keyboard", Retrieved from <http://thetechnopath.com/microsoft-patent-futuristic-virtual-multitouchkeyboard/857/> on Mar. 6, 2013, (Sep. 27, 2009), 8 pages.
Sax, et al., "LiquidKeyboard: An Ergonomic, Adaptive QWERTY Keyboard for Touchscreens", Proceedings of Fifth International Conference on Digital Society, (Feb. 23, 2011), pp. 117-122.
Serrano, et al., "Bezel-Tap Gestures: Quick Activation of Commands from Sleep Mode on Tablets", in Proceedings of the SIGCHI Conference on Human Factors in IComputing Svstems, (Apr. 27, 2013), 10 pages.
Supplemental Notice of Allowance, U.S. Appl. No. 12/713,096, dated Nov. 4, 2014, 2 pages.
Supplemental Notice of Allowance, U.S. Appl. No. 12/713,118, dated Mar. 19, 2015, 2 pages.
Supplemental Notice of Allowance, U.S. Appl. No. 12/713,133, dated Feb. 3, 2014, 2 pgs.
Supplementary European Search Report, European Patent Application No. 11747907.1, (dated Nov. 7, 2012), 3 pages.
Supplementary European Search Report, European Patent Application No. 11748027.7, (dated Nov. 29, 2012), 3 pages.
Supplementary European Search Report, European Patent Application No. 11748028.5, (dated Nov. 7, 2012), 3 pages.
Touch Screen is available in .36-50.8 mm thickness. Datasheet [online]. Thomas Net Industrial News Room. [retrieved Nov. 28, 2005]. Retrieved from the Internet <URL: http://www.news.thomasnet.com.fullstory.24891>, pp. 1-5.
TouchSystems—Innovation Touch Screen Solution, Retrieved at «http://www.touchsystems.com/article.aspx?id=16», Aug. 14, 2012, p. 1.
U.S. Appl. No. 11/324,157, Amendment and Response filed Jan. 26, 2011, 30 pgs.
U.S. Appl. No. 11/324,157, Amendment and Response filed Jan. 28, 2010, 15 pgs.
U.S. Appl. No. 11/324,157, Amendment and Response filed Mar. 11, 2009, 32 pgs.
U.S. Appl. No. 11/324,157, Amendment and Response filed Jul. 28, 2010, 28 pgs.
U.S. Appl. No. 11/324,157, Amendment and Response filed Aug. 28, 2009, 15 pgs.
U.S. Appl. No. 11/324,157, Notice of Allowance dated May 9, 2011, 8 pgs.
U.S. Appl. No. 11/324,157, Office Action dated Oct. 15, 2010, 18 pgs.
U.S. Appl. No. 11/324,157, Office Action dated Dec. 11, 2008, 13 pgs.
U.S. Appl. No. 11/324,157, Office Action dated Apr. 28, 2010, 17 pgs.
U.S. Appl. No. 11/324,157, Office Action dated Jun. 24, 2009, 15 pgs.
U.S. Appl. No. 11/324,157, Office Action dated Sep. 28, 2009, 18 pgs.
U.S. Appl. No. 13/230,700, Notice of Allowance dated May 15, 2012, 9 pgs.
U.S. Appl. No. 13/230,700, Notice of Allowance dated Jun. 21, 2012, 9 pgs.
U.S. Appl. No. 13/657,662, Amendment and Response filed Jul. 1, 2013, 8 pgs.
U.S. Appl. No. 13/657,662, Notice of Allowance dated Oct. 11, 2013, 7 pgs.
U.S. Appl. No. 13/657,662, Office Action dated Apr. 5, 2013, 11 pgs.

(56) References Cited

OTHER PUBLICATIONS

U.S. Appl. No. 13/674,357, Amendment and Response filed Oct. 29, 2014, 13 pgs.
U.S. Appl. No. 13/674,357, Amendment and Response filed Dec. 14, 2015, 15 pgs.
U.S. Appl. No. 13/674,357, Amendment and Response filed Apr. 8, 2015, 12 pgs.
U.S. Appl. No. 13/674,357, Amendment and Response filed May 16, 2016, 14 pgs.
U.S. Appl. No. 13/674,357, Amendment and Response filed Aug. 17, 2015, 13 pgs.
U.S. Appl. No. 13/674,357, Amendment and Response filed Sep. 26, 2016, 13 pgs.
U.S. Appl. No. 13/674,357, Notice of Allowance dated Jan. 26, 2017, 2 pgs.
U.S. Appl. No. 13/674,357, Notice of Allowance dated Oct. 13, 2016, 9 pgs.
U.S. Appl. No. 13/674,357, Notice of Allowance dated Nov. 14, 2016, 2 pgs.
U.S. Appl. No. 13/674,357, Office Action dated Jan. 29, 2015, 10 pgs.
U.S. Appl. No. 13/674,357, Office Action dated Feb. 17, 2016, 13 pgs.
U.S. Appl. No. 13/674,357, Office Action dated Jun. 4, 2015, 11 pgs.
U.S. Appl. No. 13/674,357, Office Action dated Jul. 27, 2016, 9 pgs.
U.S. Appl. No. 13/674,357, Office Action dated Aug. 4, 2014, 9 pgs.
U.S. Appl. No. 13/674,357, Office Action dated Sep. 17, 2015, 13 pgs.
U.S. Appl. No. 14/145,204, Amendment and Response filed Oct. 21, 2015, 3 pgs.
U.S. Appl. No. 14/145,204, Amendment and Response filed Feb. 10, 2015, 12 pgs.
U.S. Appl. No. 14/145,204, Amendment and Response filed Jun. 23, 2015, 10 pgs.
U.S. Appl. No. 14/145,204, Amendment and Response filed Aug. 4, 2014, 11 pgs.
U.S. Appl. No. 14/145,204, Notice of Allowance dated Sep. 25, 2015, 5pgs.
U.S. Appl. No. 14/145,204, Office Action dated Nov. 12, 2014, 11 pgs.
U.S. Appl. No. 14/145,204, Office Action dated Feb. 24, 2015, 10 pgs.
U.S. Appl. No. 14/145,204, Office Action dated Feb. 5, 2014, 6 pgs.
U.S. Appl. No. 14/979,910, Amendment and Response filed Oct. 11, 2016, 3 pgs.
U.S. Appl. No. 14/979,910, Amendment and Response filed May 11, 2016, 8 pgs.
U.S. Appl. No. 14/979,910, Notice of Allowance dated Nov. 1, 2016, 7 pgs.
U.S. Appl. No. 14/979,910, Notice of Allowance dated Aug. 31, 2016, 7 pgs.
U.S. Appl. No. 14/979,910, Office Action dated Feb. 22, 2016, 5 pgs.
Vallerio, Keith S., et al., "Energy-Efficient Graphical User Interface Design", Retrieved from: <http://www.cc.gatech.edu/classes/AY2007/cs7470_fall/zhong-energyefficient-user-interface.pdf>, (Jun. 10, 2004), pp. 1-13.
Vigil, Jose M., "Methods for Controlling a Floating Cursor on a Multi-touch Mobile Phone or Tablet in Conjunction with Selection Gestures and Content Gestures", U.S. Appl. No. 61/304,972, (Feb. 16, 2010), 54 pages.
Yee, Ka-Ping "Two-Handed Interaction on a Tablet Display", Retrieved from: <http://zesty.ca/tht/yee-tht-chi2004-short.pdf>. Conference on Human Factors in Computing Systems, (Apr. 2004), 4 pages.
U.S. Appl. No. 15/426,548, Office Action dated Jun. 30, 2017, 7 pages.
U.S. Appl. No. 15/453,403, Office Action dated Jun. 30, 2017, 7 pages.
Advisory Action, U.S. Appl. No. 12/695,842, dated Mar. 28, 2016, 3 pages.
Advisory Action, U.S. Appl. No. 12/695,842, dated May 12, 2015, 3 pages.
Decision on Reexamination, CN Application No. 201110046519.X, dated May 28, 2015, 8 Pages.
Extended European Search Report, EP Application No. 13738283.4, dated Aug. 4, 2015, 7 pages.
Final Office Action, U.S. Appl. No. 12/695,842, dated Feb. 2, 2016, 10 pages.
Final Office Action, U.S. Appl. No. 12/695,976, dated Aug. 5, 2015, 12 pages.
Final Office Action, U.S. Appl. No. 12/695,976, dated Nov. 27, 2015, 11 pages.
Final Office Action, U.S. Appl. No. 12/700,357, dated Aug. 31, 2015, 14 pages.
Final Office Action, U.S. Appl. No. 12/700,510, dated Mar. 14, 2016, 36 pages.
Final Office Action, U.S. Appl. No. 12/709,282, dated Aug. 24, 2015, 24 pages.
Final Office Action, U.S. Appl. No. 12/713,113, dated Aug. 5, 2015, 26 pages.
Final Office Action, U.S. Appl. No. 12/713,127, dated Jul. 31, 2015, 19 pages.
Final Office Action, U.S. Appl. No. 13/352,193, dated Oct. 1, 2015, 23 pages.
Final Office Action, U.S. Appl. No. 13/484,075, dated Jul. 16, 2015, 10 pages.
Final Office Action, U.S. Appl. No. 13/484,075, dated Nov. 10, 2015, 11 pages.
Final Office Action, U.S. Appl. No. 13/898,452, dated May 19, 2017, 24 pages.
Foreign Notice of Allowance, CN Application No. 201180009579.2, dated Mar. 7, 2016, 4 Pages.
Foreign Notice of Allowance, CN Application No. 201180010769.6, dated Apr. 30, 2015, 4 Pages.
Foreign Notice of Allowance, CN Application No. 201180011039.8, dated Jan. 13, 2016, 4 Pages.
Foreign Notice of Allowance, CN Application No. 201380005804.4, dated Sep. 30, 2016, 4 pages.
Foreign Office Action, CN Application No. 201180010692.2, dated Mar. 28, 2016, 7 Pages.
Foreign Office Action, CN Application No. 201180009579.2, dated Apr. 21, 2015, 16 Pages.
Foreign Office Action, CN Application No. 201180009635.2, dated Jul. 28, 2014, 13 pages.
Foreign Office Action, CN Application No. 201180010692.2, dated Sep. 15, 2015, 10 Pages.
Foreign Office Action, CN Application No. 201180011039.8, dated Sep. 6, 2015, 7 pages.
Foreign Office Action, CN Application No. 201380005804.4, dated Mar. 1, 2016, 13 Pages.
Foreign Office Action, EP Application No. 11737428.0, dated Nov. 18, 2013, 4 pages.
Foreign Office Action, EP Application No. 15713073.3, dated Mar. 16, 2017, 4 pages.
Non-Final Office Action, U.S. Appl. No. 12/695,842, dated Aug. 13, 2015, 18 pages.
Non-Final Office Action, U.S. Appl. No. 12/700,357, dated Dec. 16, 2015, 10 pages.
Non-Final Office Action, U.S. Appl. No. 12/700,510, dated Aug. 28, 2015, 34 pages.
Non-Final Office Action, U.S. Appl. No. 12/709,204, dated May 7, 2015, 14 pages.
Non-Final Office Action, U.S. Appl. No. 12/713,096, dated Dec. 30, 2015, 5 pages.
Non-Final Office Action, U.S. Appl. No. 13/352,193, dated Mar. 22, 2016, 23 pages.
Non-Final Office Action, U.S. Appl. No. 13/484,075, dated Apr. 29, 2015, 8 pages.
Non-Final Office Action, U.S. Appl. No. 15/142,758, dated May 19, 2017, 12 pages.

(56) References Cited

OTHER PUBLICATIONS

Notice of Allowance, U.S. Appl. No. 12/709,204, dated Sep. 25, 2015, 7 pages.
Notice of Allowance, U.S. Appl. No. 13/352,193, dated Jul. 29, 2016, 10 pages.
Search Report, TW Application No. 099142890, dated Jun. 30, 2015, 1 page.
Supplemental Notice of Allowance, U.S. Appl. No. 13/352,193, dated Nov. 14, 2016, 2 pages.
Supplementary European Search Report, EP Application No. 11737428.0, dated Nov. 13, 2004, 3 pages.
Sax, "LiquidKeyboard: An Ergonomic, Adaptive QWERTY Keyboard for Touchscreens and Surfaces", ICDS 2011, The Fifth International Conference on Digital Society, Feb. 23, 2011, 6 pages.
U.S. Appl. No. 15/426,548, Amendment and Response filed Oct. 2, 2017, 11 pages.
U.S. Appl. No. 15/426,548, Notice of Allowance dated Dec. 7, 2017, 7 pages.
U.S. Appl. No. 15/453,403, Amendment and Response filed Oct. 2, 2017, 11 pages.
U.S. Appl. No. 15/453,403, Notice of Allowance dated Dec. 5, 2017, 7 pages.
"Second Office Action and Search Report Issued in Chinese Patent Application No. 201380059094.3", dated Aug. 17, 2017, 21 pages.
U.S. Appl. No. 15/413,705, Office Action dated Mar. 26, 2018, 6 pages.

\* cited by examiner

| Confidence of touch N | C1 | C2 | C3 | C4 | C5 |
|---|---|---|---|---|---|
| Parameter 1 | P1-1 | P1-2 | P1-3 | P1-4 | P1-5 |
| Parameter 2 | P2-1 | P2-2 | P2-3 | P2-4 | P2-5 |
| Reliability for particular touch R | R1 | R2 | R3 | R4 | R5 |

Fig. 10

UNINTENTIONAL TOUCH REJECTION

CROSS-REFERENCE TO RELATED APPLICATIONS

This application is a continuation application of, and claims priority to, U.S. patent application Ser. No. 14/979,910 (now U.S. Pat. No. 9,594,457), filed Dec. 28, 2015, which is a continuation of, and claims priority to, U.S. patent application Ser. No. 14/145,204, filed Dec. 31, 2013, and issued as U.S. Pat. No. 9,261,964 on Feb. 16, 2016, which is a continuation application of, and claims priority to, commonly owned U.S. patent application Ser. No. 13/657,662, filed Oct. 22, 2012, and issued as U.S. Pat. No. 8,659,570 on Feb. 25, 2014, which is a continuation application of, and claims priority to, U.S. patent application Ser. No. 13/230,700, filed Sep. 12, 2011, and issued as U.S. Pat. No. 8,294,686 on Oct. 23, 2012, which is a continuation application of, and claims priority to, U.S. patent application Ser. No. 11/324,157, filed on Dec. 30, 2005, and issued as U.S. Pat. No. 8,018,440 on Sep. 13, 2011, each of the above applications is incorporated herein in its entirety by reference.

BACKGROUND

Touch-sensitive devices are becoming widespread in computing devices as a means of input, especially computing devices that are intended for portable use. Touch-sensitive devices are very convenient as they allow a user to make natural gestures familiar to the user in other contexts, such as by entering handwriting using a dedicated stylus in a manner similar to using a pen. While this provides a natural feel for the use, one potential problem with a dedicated stylus is that it can be lost. As can be appreciated, this is problematic if the dedicated stylus is required in order to electronically write or ink on the touch-sensitive device. Another potential problem is that it may be inconvenient to retrieve the stylus from its storage location when needed for only occasional use. Therefore, many of the computing devices include touch-sensitive surfaces that allow input to be provided by a variety of stylus types, including a user's fingertip. Accordingly, the term touch-sensitive surface or device will be used herein to refer to such surfaces or devices that are configured to detect the touch of any or all stylus types. While generally a convenient feature, a disadvantage to this ability to accept input from a variety of stylus types is that it is likely that the user will, from time to time, inadvertently touch the touch-sensitive surface with the user's finger, hand, etc., while writing on the device. This may also happen while the user is holding or otherwise handling the device. Users may find that these inadvertent touches perform undesired actions.

SUMMARY

In at least some embodiments an unintentional touch on a touch-sensitive device is automatically rejected. A touch is detected and a set of parameters related to the touch may be generated. The set of parameters may be used to determine a reliability value for the touch. The reliability value may be transmitted to a software module and the software module can determine a confidence level based on the reliability value and an activity context. The confidence level may include a determination of changes in the reliability over time.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present invention is illustrated by way of example and not limited in the accompanying figures in which like reference numerals indicate similar elements and in which:

FIG. 10 illustrates a depiction of data related to a series of touches that may be used in accordance with one or more aspects of the present invention.

DETAILED DESCRIPTION

Exemplary Computing Environment

Figure 1:
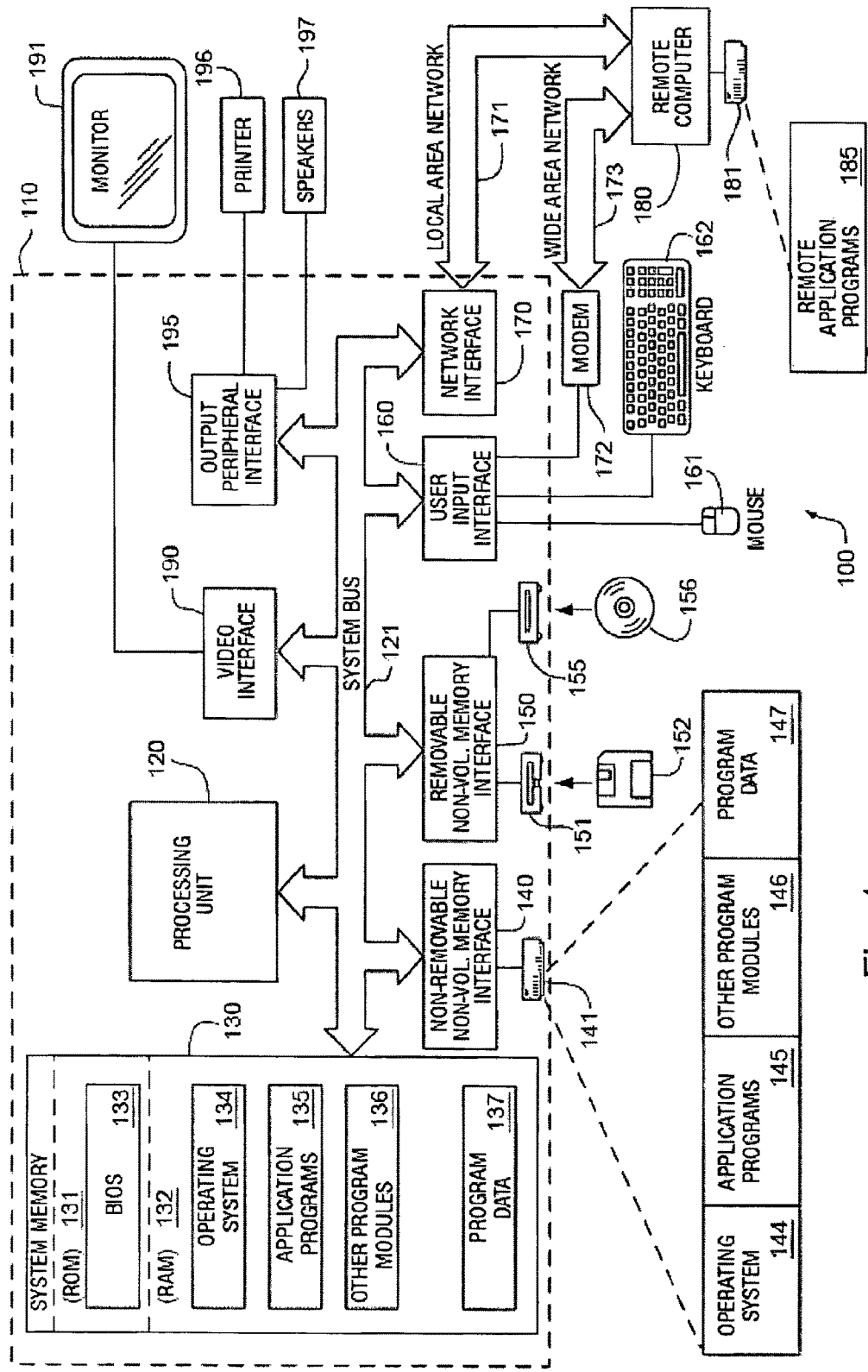
FIG. 1 illustrates a schematic diagram of an exemplary general-purpose digital computing environment in which certain aspects of the present invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, and program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
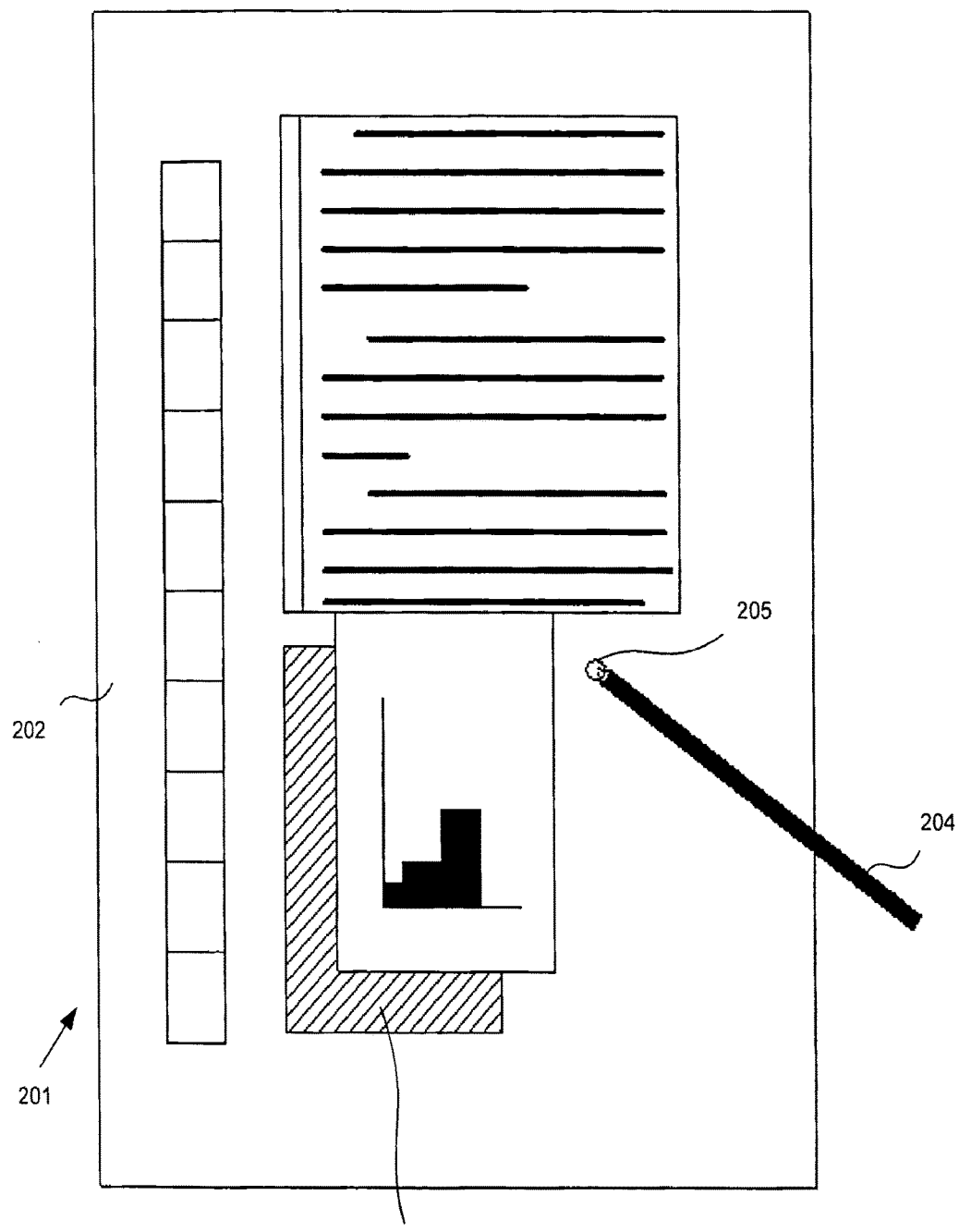
FIG. 2 illustrates an embodiment of a Tablet PC computing environment in which certain aspects of the present invention may be implemented.

FIG. 2 illustrates an exemplary tablet PC 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 are displayed. Using stylus 204, a user can select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Tablet PC 201 interprets gestures made using stylus 204 in order to manipulate data, enter text, create drawings, and/or execute conventional computer application tasks such as spreadsheets, word processing programs, and the like.

The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be the stylus 204 and used for selecting or indicating portions of the displayed image on a touch-sensitive or proximity-sensitive display. Consequently, the term "user input device", as used herein, is intended to have a broad definition and encompasses many variations on well-known input devices such as stylus 204. Region 205 shows a feedback region or contact region permitting the user to determine where the stylus 204 has contacted the display surface 202.

In various embodiments, the system provides an ink platform as a set of COM (component object model) services that an application can use to capture, manipulate, and store ink. One service enables an application to read and write ink using the disclosed representations of ink. The ink platform may also include a mark-up language including a language like the extensible markup language (XML). Further, the system may use DCOM as another implementation. Yet further implementations may be used including the Win32 programming model and the .Net programming model from Microsoft Corporation.

Inadvertent Touch Rejection

Before discussing various embodiments, it should be noted that numerous types of touch-sensitive devices, such as touch-sensitive displays, exist. Touch-sensitive devices may detect changes in pressure, light, displacement, heat, resistance or capacitance, just to name a few variations. Furthermore, touch-sensitive devices may be configured to detect an input device such as a dedicated stylus when the dedicated stylus is moved within a proximity zone. For example, a dedicated stylus could emit or retransmit a signal or could include a particular material (such as a magnet) or a particular configuration of a material (such as a coil) in a tip. Numerous variations are possible depending on the hardware used to detect the touch.

Figure 3:
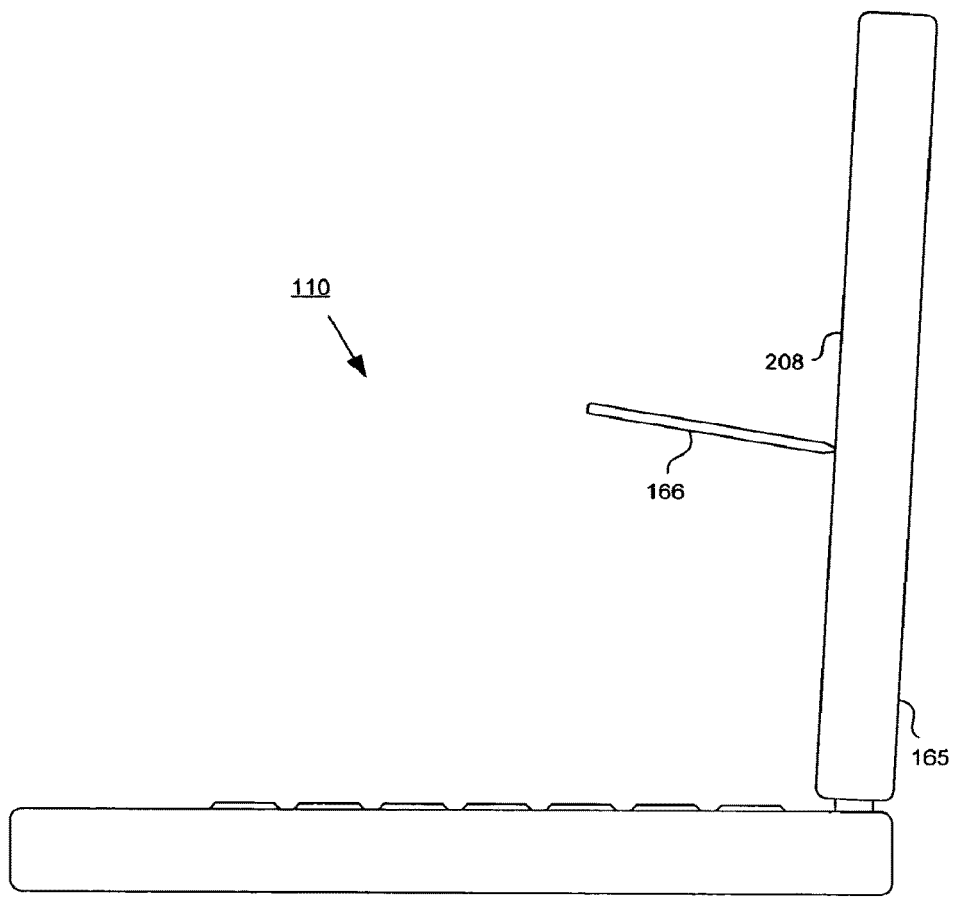
FIGS. 3-4 illustrate embodiments of a computer in which certain aspects of the present invention may be implemented.
Figure 4:
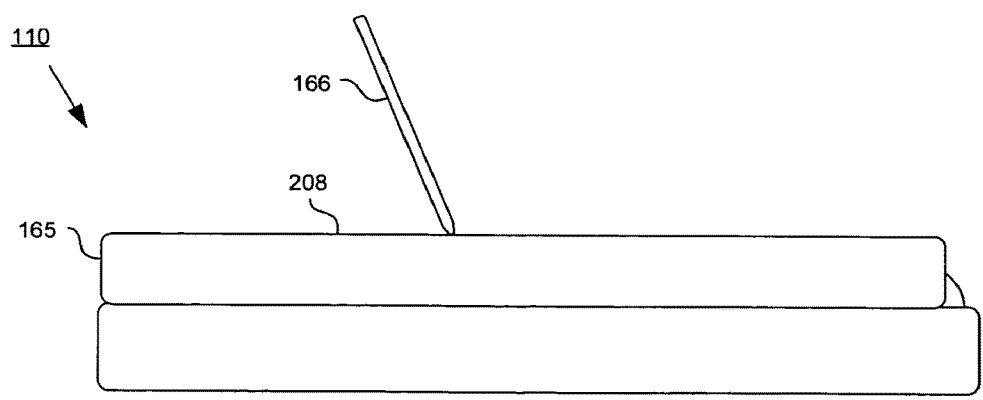

Looking at FIG. 3, an embodiment of a computer 110 in a typical laptop configuration is depicted. Somewhat similarly, FIG. 4 illustrates an embodiment of a computer 110 in a tablet configuration. As is known, variations in size and performance are possible, thus the depicted computers could be made smaller so as to fit within a user's pocket. In addition, some computers are configured to transition between laptop and tablet configuration. In addition, some computers may mount the display separately. In both depicted embodiments, however, a touch-sensitive device 165 is incorporated as part of the computer 110. As illustrated, the touch-sensitive device 165 is also a display; however the touch sensitive device 165 is not so limited. The touch-sensitive device 165 includes a touch-sensitive surface 208 on which a stylus 204, which may be a finger, can write, tap or provide other types of input.

In either configuration, it is expected that occasionally a person will inadvertently touch the screen with the person's hand while providing input to the touch-sensitive surface. For example, typically a person will rest a portion of their hand on the writing surface while writing. In certain embodiments, as discussed in greater detail below, this extra touch is determined to be inadvertent and is automatically rejected.

A touch-sensitive display can be configured to process the touch and determine whether the touch should be rejected based on characteristics of the touch alone. For example, a display can compare the pressure and area of the touch to determine whether the touch matches expected touch patterns typically used for input. This single level of control, while useful, can also benefit from additional processing.

Figure 5:
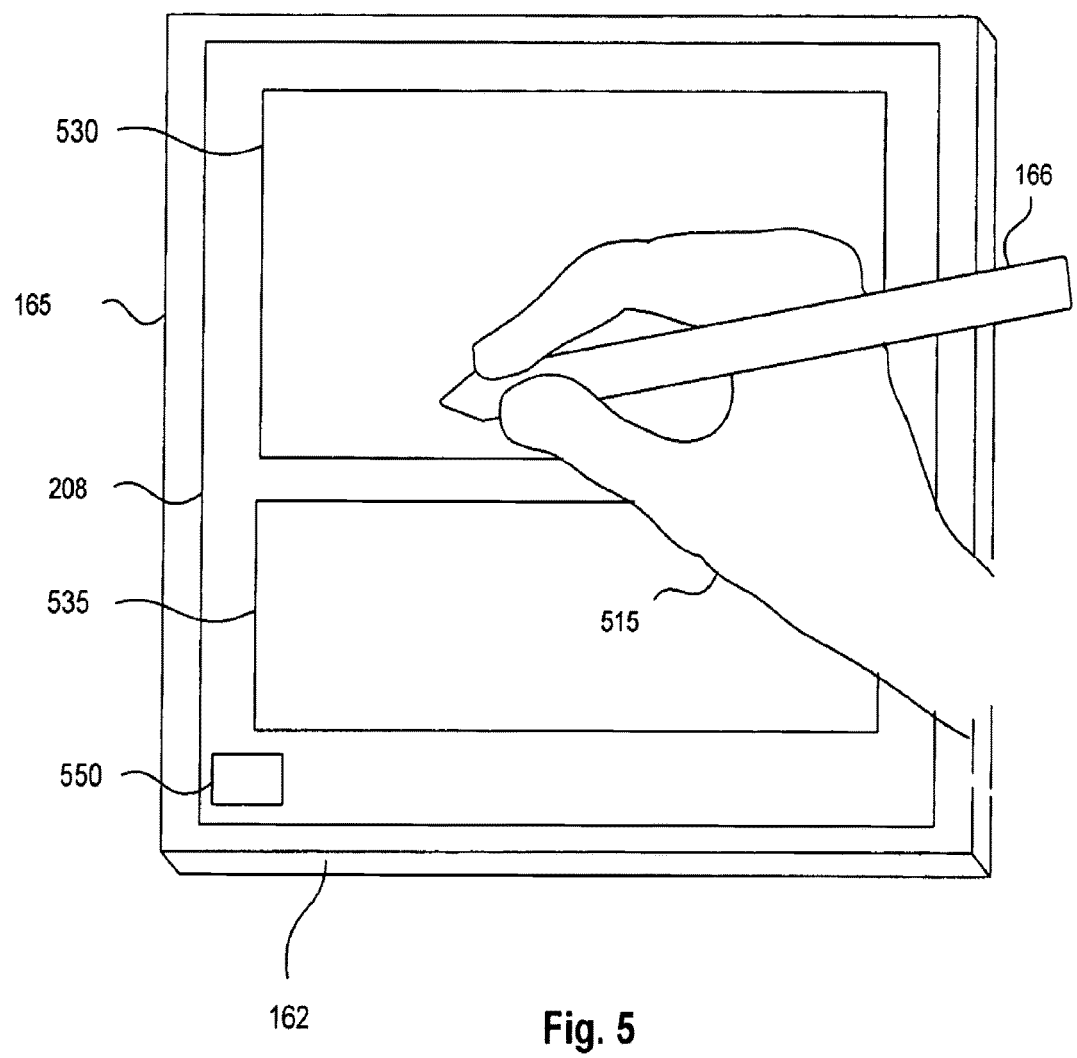
FIG. 5 illustrates an embodiment of user interface with a touch-sensitive device in which certain aspects of the present invention may be implemented.

Turning to FIG. 5, an embodiment of an individual using a touch-sensitive display is depicted. The user is writing with a dedicated stylus 204 and is holding a hand 415 over the touch-sensitive surface 208 of the touch-sensitive device 165. It should be noted that, depending on the configuration, a housing 162 of the computer 110 may also be the housing of the touch-sensitive device 165. Alternatively, the housing 162 of the computer 110 may be split into portions that may be connected, either indirectly or directly and either wirelessly or wired. Displayed on the touch-sensitive surface 208 is a first window 530, a second window 535 and a third window 550. As is known, a window refers to a portion of a screen display associated with an application or with an OS process.

As can be appreciated, the dedicated stylus 204 is positioned so as to electronically create ink (e.g. ink) on the first window 530 while the hand is positioned over the first window 430 and the second window 535. However, neither the hand 515 nor the dedicated stylus 204 is positioned near the third window 550. More will be said with respect to this below.

Figure 6:
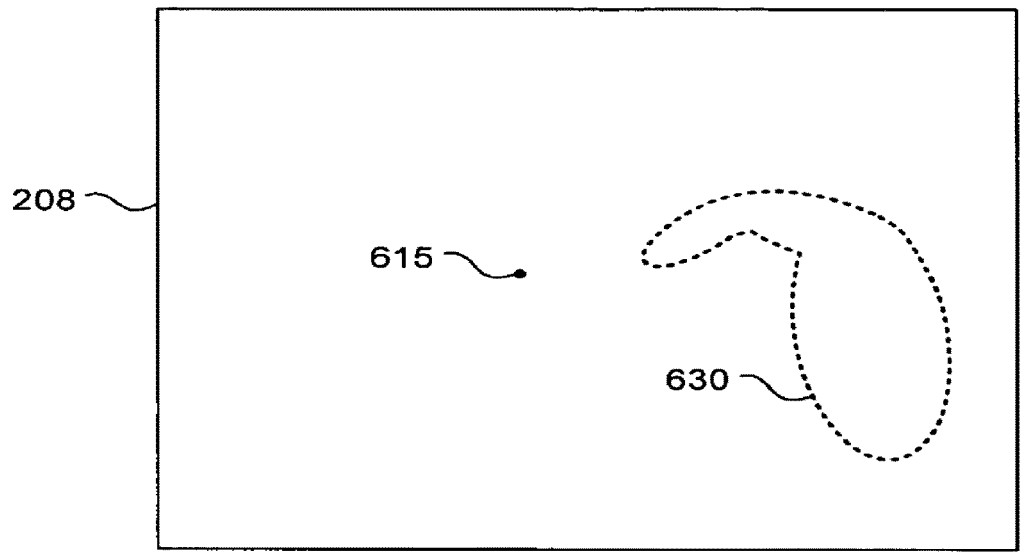
FIGS. 6-7 illustrate embodiments of touches on a touch-sensitive surface in which certain aspects of the present invention may be implemented.

Turning to FIG. 6, a touch-sensitive surface 208 is depicted, the touch-sensitive surface 208 being exemplary of what may be provided on a touch-sensitive display. Provided on the touch-sensitive surface 208 is a first touch 615 and a second touch 630. As can be appreciated, given the discrepancy in size and shape, it is relatively simple to reject the touch 630 as being unwanted. For example, while a user's finger can come in a range of sizes, the touch 630 plainly exceeds such a range and therefore a simple determination that the area of touch 630 exceeds a predetermined limit could be used to reject the touch. In an alternative embodiment, the shape of the touch 630 may be used to determine the touch was inadvertent.

Figure 7:
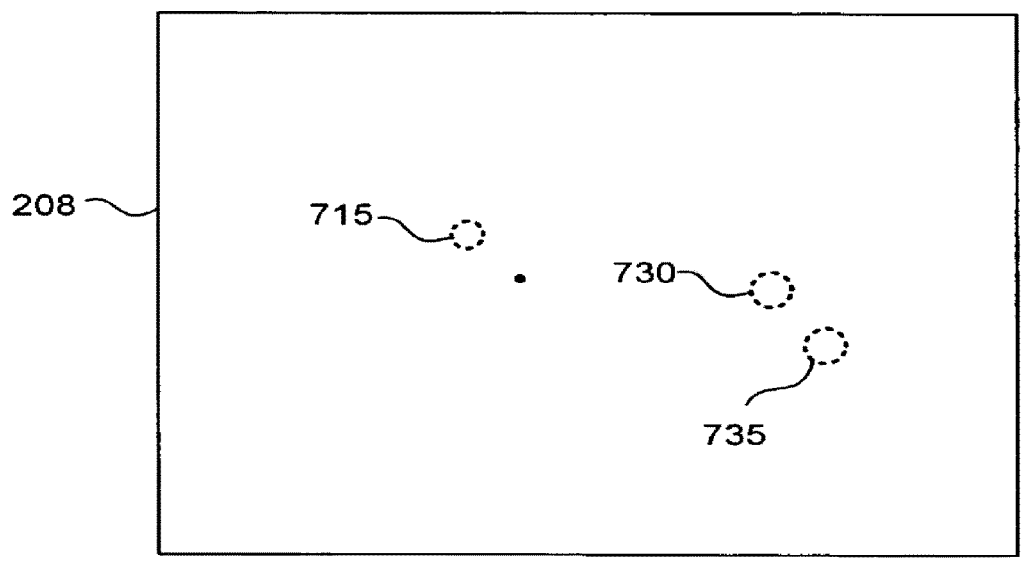

Turning to FIG. 7, an embodiment of a touch-sensitive surface 208 is depicted with alternative touches 715, 730 and 735. While the touch 715 is slightly smaller than the touch 730 or touch 735, they all fit within a range of expected variations of a finger size and therefore it is difficult to reject the touches as being inadvertent based on pressure and area alone. As can be appreciated, touches typically vary with time. Therefore, the touches 730 and 735, while initially resembling points similar to what would be expected for a finger, may eventually grow to resemble touch 630.

In other words, because of the sampling frequency of the touch-sensitive device 165, which may be greater than 200,000 Hz, the touch-sensitive surface 208 may initially detect a touch that resembles the touch 730 or 735 (or both) and over time the detected touch will start to resemble the touch 630.

Thus, a touch-sensitive device 165 (FIG. 5) might initially determine that touch 715 and touches 730 and 735 were acceptable touches. In other words, the touch-sensitive device 165 would indicate that touches 730 and 735 both had high reliability. In contrast, the touch-sensitive device 165 would indicate that touch 630 had low reliability. As can be appreciated, the change in the touch may affect the reliability determination. It should be noted that reliability may be based on the measurable information relating to the touch such as, but not limited to, pressure, area, rates of change in characteristics of the touch, and velocity of movement, thus different touch-sensitive devices may use different mechanisms for determining the reliability of a particular touch based on their underlying technology. Furthermore, certain touch-sensitive devices may be better at accurately determining reliability for a particular touch or type of touch.

Figure 8B:
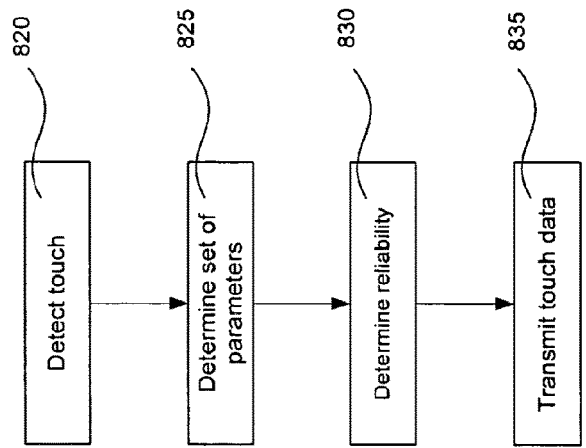
FIG. 8b illustrates an alternative method of rejecting an inadvertent touch that may be used in accordance with one or more aspects of the present invention.
Figure 8A:
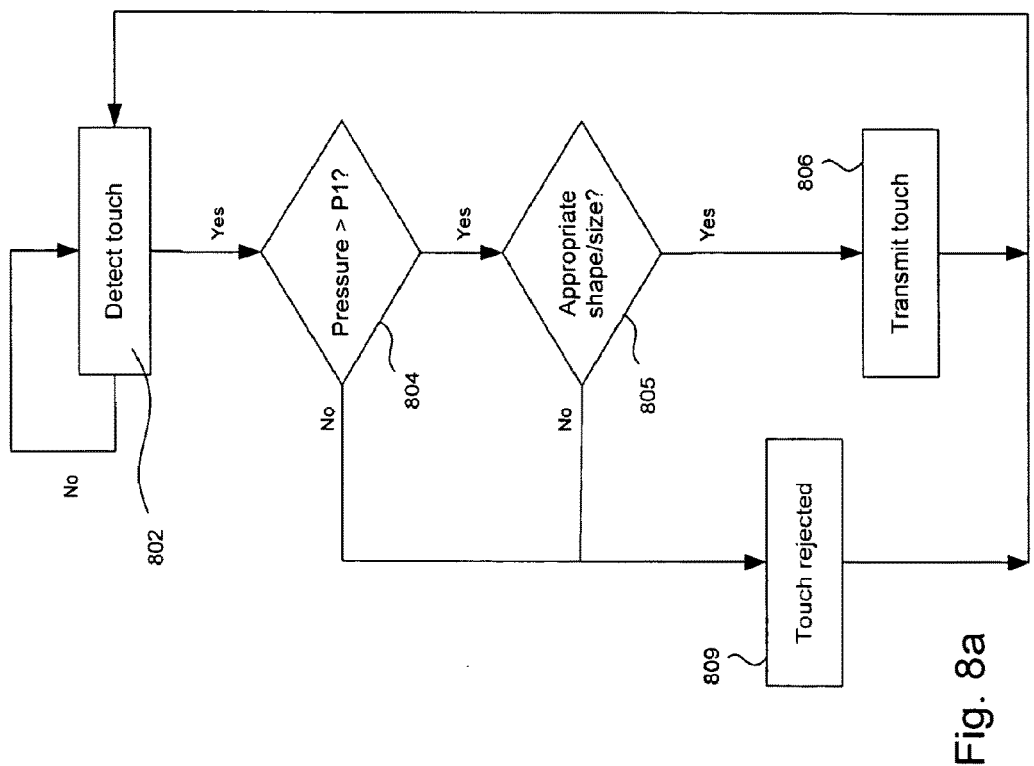
FIG. 8a illustrates a method of rejecting an inadvertent touch that may be used in accordance with one or more aspects of the present invention.

FIG. 8a illustrates a method that may be used to determine whether to reject the touch 530. First in step 802 a touch is detected. Next in step 804, a check is made to see if the pressure applied by the touch exceeds some minimum. If it does, then in step 805 a check is made to see if the touch is the appropriate size or shape. In at least some embodiments, this can be done by comparing the touch to a predetermined set of sizes or shapes. If the touch meets the requirements of steps 804 and 805, then in step 806 the touch is treated as an input and transmitted to the appropriate software module. If the touch fails to pass either step 804 or step 805, then in step 809 the touch is rejected.

As can be appreciated, however, the method of FIG. 8a may be unable to determine that certain types of inadvertent touches, such as the touch 730, should be rejected. Therefore, a method as illustrated in FIG. 8b may be used.

First in step 820, a touch is detected. As noted above, the method of detecting the touch depends on the type of hardware chosen. Thus, a resistance based touch-sensitive surface would detect changes in resistance and a capacitance based touch-sensitive surface would detect changes in capacitance. The present invention is not limited to a particular type and therefore the decision of which type of touch-sensitive device to use is primarily a design choice based on tradeoffs between different technologies and their respective costs and features.

Next in step 825, a set of parameters are determined. The parameters may include, but are not limited to, location of the touch, area of the touch, shape of the touch, pressure of the touch, and number of points of contact of the touch. The parameters may also be specific to a particular hardware such as change in resistance or capacitance. It should be noted that different parameters may have different ranges of values, depending on the type of parameter. Thus, a parameter for area may be in square meters while a parameter related to a change in resistance might be in ohms or volts.

It should be noted that, depending on the sampling frequency, two touches that are related, such as two portions of the same palm, may not touch the touch-sensitive surface at the same time. Therefore, two distinct touches can be joined together if they are nearby or are initially detected at about the same time. In addition, if two touches, such as the touches 730 and 735 of FIG. 7, move together they can also be determined to be part of the same touch.

In addition to the above parameters, derived parameters such as the rate of change in a parameter can also be determined. If a rapid sampling rate is used, the rate of change per sample may be relatively small but even relatively small rates of change can be useful to determine whether a touch should be rejected. Furthermore, a change or rate of change over a series of samples may also be determined. The level of noise in a parameter value is another parameter that can be determined. Therefore, the parameters can be provided for all types of physically detectable characteristics of the touch as well as derivations of these detectable characteristics. In addition, these characteristics may be operated on with filters to smooth or otherwise process the data. For example, the noise in a parameter may be filtered out. Thus, in at least some embodiments, the noise itself would be filtered while the level of noise would be used as a parameter. Filters may provide additional types of processing. For example, a centroid of the area of the touch may be determined so as to provide a more precise location of the touch. In addition, data points that suggest a fluctuation too fast to be representative of a human touch and/or an intended touch can be filtered. Numerous other filters may be used as desired.

Figure 11:
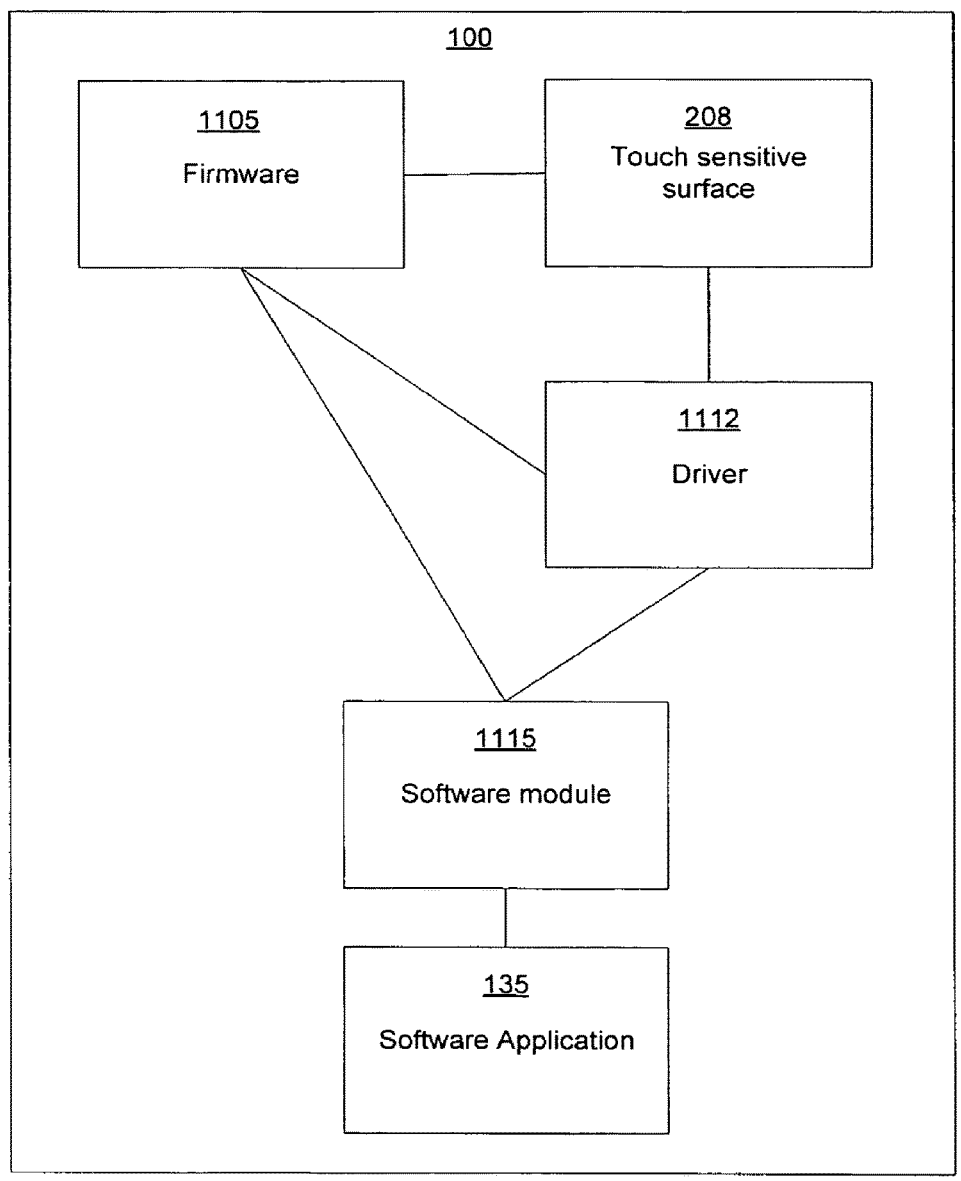
FIG. 11 illustrates a schematic of an exemplary computing environment that may be used in accordance with one or more aspects of the present invention.

Next in step 830, the reliability of the touch is determined. In an embodiment this can be done by the touch-sensitive device 165 itself. For example, looking at FIG. 11, a computing environment 100 includes a touch-sensitive surface 208 in communication with a firmware 1105. In an embodiment, the firmware may be software embedded into the touch-sensitive device. The firmware 1105 may determine the reliability value based on a set of parameters. Depending on the type of hardware, components such as A/D converters and other known circuits may be placed between the touch-sensitive surface 208 and the firmware 1105 so as to transform the physical touch into digital data in a known manner. For example, a circuit that detects changes in resistance, which is an analog measurement, could provide these changes to an A/D converter so as to translate the changes into digital values in a known manner.

In an embodiment, the firmware 1105 may be omitted and the reliability determination may be done by a driver 1112. As is known, a driver can provide a level of abstraction that allows higher level programs, such as an operating system, to communicate or receive information from a particular piece of hardware but, unlike the firmware, a driver is typically provided separate from the hardware. In an alternative embodiment, both a driver and firmware may be used in series or in parallel to transmit information to the software module 1115. In another alternative embodiment, the firmware 1105 may generate the set of parameters and the driver 1112 may determine the reliability value. As can be appreciated, the firmware 1105 and the driver 1112 are both examples of a device driver that provides an interface between the operation system and the specific hardware used by the touch-sensitive device 165.

The reliability may include a number of factors such as the value of one or more parameters along with the rate of change of one or more parameters. In at least some embodiments, the reliability can be a probability that the touch is intended. For example, the height (h) and width (w) of a touch can be used to calculate a probability (p) that a touch was intended:

$$p=f(a)+f(s)$$

where $f(a)=\alpha/(\epsilon+\sigma h*w)$; and $$f(s)=\alpha/(\epsilon+\beta|(h^2-w^2)|)$$

In the above equation, α, β, σ, and ε may represent constants (or more complex functions) that can be used to weight the importance of various factors, and f(a) represents some function of area while f(s) represents a function of shape, both of which are based on the height (h) and the width (w). In general, however, as can be appreciated from the above equation, the probability that the touch is an intentional touch increases as the area of the touch decreases and the probability also increases the more closely the shape of the touch has the same height and width. As can be readily appreciated from this example, a large number of variations in how the reliability is determined are possible. In an alternative embodiment, the reliability may be a sum of the number of parameters that are within an accepted range. Thus, there are an almost unlimited number of variations in how the reliability value may be determined, subject to inherent limitations or unique characteristics of the hardware chosen.

After the reliability value is determined, in step 835 the touch data is communicated (e.g. transmitted) to the software module 1115 (FIG. 11) which uses the reliability value to generate a confidence level. The software module may be part of the operating system or some other separate software module that is configured to receive the reliability data. The touch data may include just the reliability value and a location of the touch or it may include additional details of the parameters, as desired.

In at least some embodiments, the firmware 1105 and/or the driver 1112 can be configured to process a sufficient number of variables so as to make the reliability value, which may also be an array of values, more valuable. In an alternative embodiment, the firmware 1105 and/or the driver 1112 may make minimal calculations and allow the software module to analyze more of the data. In such an embodiment, the parameters may be observable features without derived values and the confidence determination may include calculations related to changes in the parameters over time.

Figure 9:
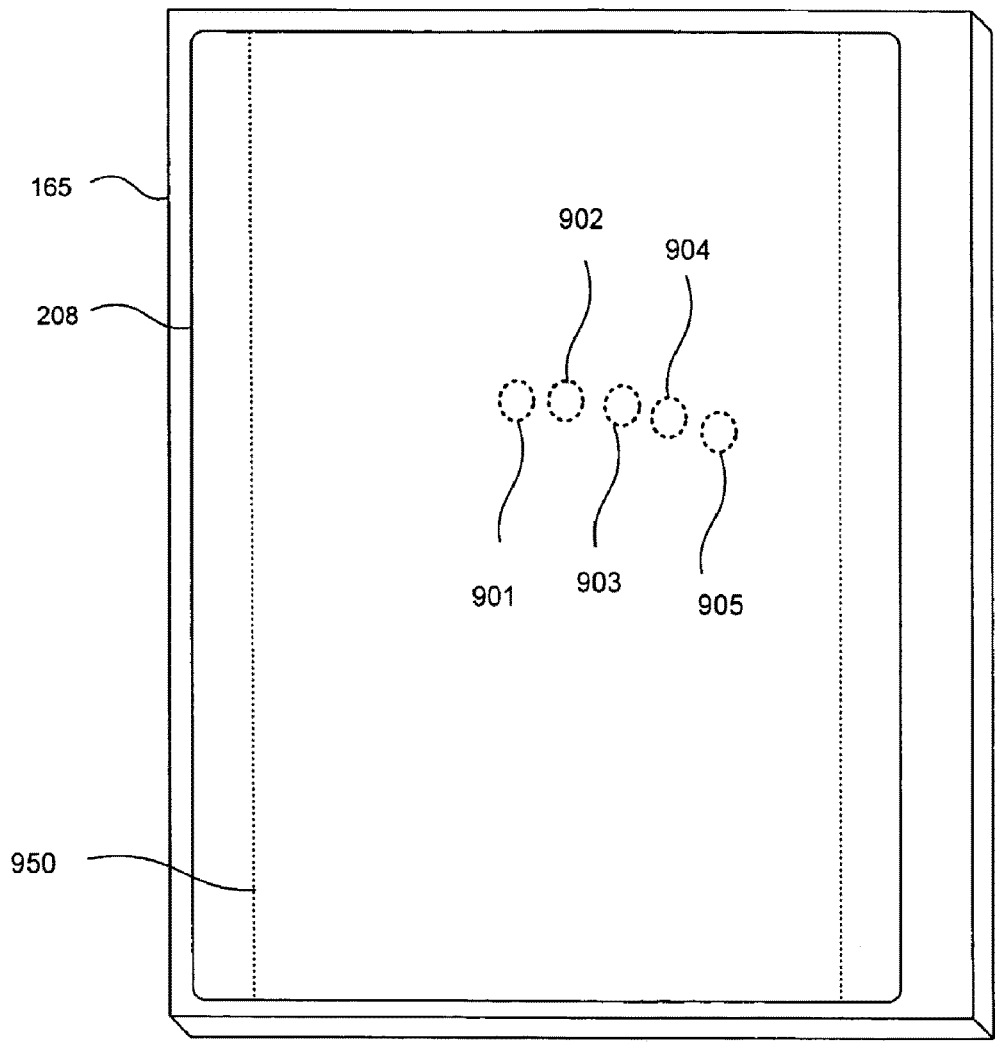
FIG. 9 illustrates an embodiment of a set of touches on a touch-sensitive surface in which certain aspects of the present invention may be implemented.

As briefly noted above, typically a touch will change over time, either in location or shape or size or some other parameter. For example, FIG. 9 illustrates a touch-sensitive device 165 with a touch-sensitive surface 208. Depicted on the touch-sensitive surface 208 are five touches 901-905. The touches 901-905 represent 5 touches detected in subsequent intervals. As can be appreciated, touches 901-905 may be the same touch over time or may actually be different touches. While depicted as being similar, values for some or all of the parameters previously discussed may be different for some or all of touches 901-905.

Turning to FIG. 10, a diagram for a data structure holding data relating to multiple touches is provided. P1-1 represents a first parameter of the touch 901, P1-2 represents a first parameter of touch 902, P1-3 represents a first parameter of touch 903, P1-4 represents a first parameter of touch 904 and P1-5 represents a first parameter of touch 905. Similarly, P2-1 through P2-5 represent a second parameter for touches 901-905, respectively. In at least some embodiments, the first parameter is an area of the touch and the second parameter represents the shape of the touches. It should be noted that additional parameters may be added and that the parameters P1 and P2 may represent any other parameters desired. For example, a parameter for location or velocity or acceleration of the touch may also be included. It should be noted that a parameter based on a change over time such as velocity will initially have a value of zero but, assuming a reasonably high sampling frequency, will quickly become some non-zero value.

Once the parameters for the touches are determined, a reliability value R1 through R5 may be determined for each of the touches 901-905, respectively. As can be appreciated, the reliability of each of the touches 901-905 depends on values of P1 and P2, thus each of the reliability values R1-R5 for each of the touches 901-905 may be independent of the other reliability values.

Figure 12:
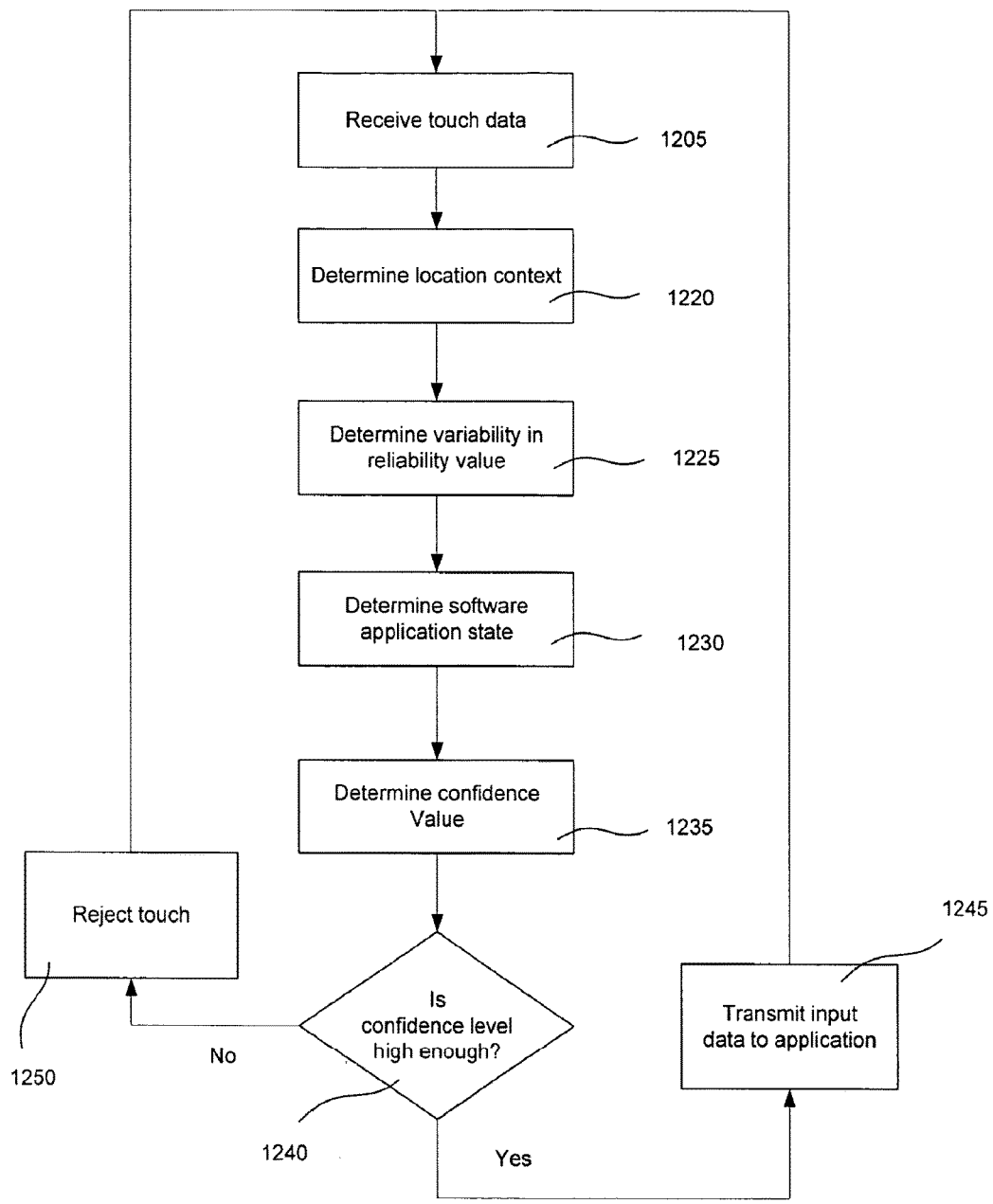
FIG. 12 illustrates a method for determining whether to reject a touch that may be used in accordance with one or more aspects of the present invention.

Once the reliability value for the touch is determined, it can be communicated or transmitted to the software module 1115 (FIG. 10). In an embodiment, the software module may be, without limitation, the operating system 134 (FIG. 1). The software module 1115 then uses the reliability value to determine a confidence value. FIG. 12 illustrates an embodiment of such a determination.

First in step 1205, the reliability data is received. In at least some embodiments, the reliability data may include the reliability value and a location of the touch. In an alternative embodiment, the reliability data may include the reliability value, the location of the touch and one or more additional parameters.

Next in step 1220, the software module determines a location context. This can be done by querying a software application 135. The location context is part of an activity context, and the location context includes the location of various windows or regions on the display along with their intended use. Referring back to FIG. 5, a touch may be located in the window 530, in the window 535, in the window 550 or not in any of the above windows. Different applications may vary the treatment of touches in different windows. In an embodiment, an application may ignore any touch outside the window 530. In another embodiment, an application may accept certain types of gestures in the window 535. In yet another embodiment, any touch in the window 550 may trigger an action. This latter embodiment may be useful if the window is located in a position of the touch-sensitive surface that is unlikely to be inadvertently touched. In yet another embodiment, an application may require a more perfect touch, thus causing a greater range of touches to be rejected within the window 530.

As can be appreciated, variations are possible and different applications can reject or accept different ranges of touches so as to optimize the rejection of unintentional touches versus the accidental rejection of intentional touches. And for certain windows where an input is desired, any touch may be sufficient. Therefore, the location context provides information to the software module regarding what window or application is or would be affected by touch and what range of touches (e.g. the needed confidence level for a touch) are acceptable in that window or area. It should be further noted that if desired, the range of acceptable touches may be user configurable.

Next in step 1225, the software module determines the variability in the reliability value. Referring back to FIG. 9, in an embodiment where the touches 901-905 represent the same touch over time, the touch may have a high reliability value for R1, R3 and R5 and a low reliability value for R2 and R4. The expected behavior for an intentional touch is a more consistent reliability value; therefore such a variation in reliability would suggest the touch should be rejected. For example, a palm resting on a touch-sensitive surface while the user was using a stylus would typically progress through a range of shapes and sizes in the touch as the user moved his or her hand across the touch-sensitive surface.

Next in step 1230, the state of an active application, which may also be part of the activity context, is considered. This may include the time the application has waited for an input, the type of input expected and historical patterns of input, to mention a few variations. For example, if a user has consistently used a stylus to enter data in an application window, then a touch in that window that does not match the stylus may be initially rejected. As a user may interact in a unique manner with different applications, this allows each application to be treated uniquely.

Next in step 1235 a confidence level is determined. The confidence level incorporates one or more factors of the reliability of the touch along with the activity context to make a more informed decision of whether to reject the touch. Thus, the confidence level combines one or more factors related to reliability with one or more factors related to activity context. It should be noted that the reliability factors may include a determination of an average reliability over a greater period of time, which may be one to five seconds and may also include variations in the reliability over time. As can be appreciated, the activity context can vary and may include, but is not limited to, a determination of whether the location of the touch is in a window associated with an application, a determination of an active application, a determination that the area being touched is an active area, a determination of whether multiple touches are being made substantially simultaneously, a determination of whether multiple touches are expected, a determination of whether a profile of the touch matches a known gesture, a determination of how a particular application treats touches, and a determination of whether another valid touch is being made in a different location on the touch-sensitive display. Therefore, the calculation of the confidence level may be any desirable algorithm and may vary with particulars of hardware implementations.

It should be noted that the confidence level may also involve a consideration of parameters used to determine the reliability value. Historical variations in a particular parameter such as the velocity, direction of movement or the number of points of contact of a touch (which are really the composite of a number of touches that can be linked together because of their proximity and the frequency of sampling) may also be considered. For example, while the firmware may determine that the touch has a low reliability, the software module may determine that the touch represents a gesture specific to an application and therefore an appropriate input may be transmitted to the application. This allows customized gestures to be associated with each application, even if the gestures are not recognized by the firmware or the driver. However, the firmware or driver may also include the ability to recognize certain gestures. Therefore, as can be appreciated, numerous variations exist in how the parameters related to the touch are handled.

Next in step 1240, a comparison of the confidence level to a predetermined level is made. As noted above, the predetermined level may change depending on a number of factors such as, but not limited to, the location of the touch and which application is active. If the confidence level of the touch meets the predetermined level, then in step 1245 the touch is communicated or transmitted to the application as an input. If the confidence level of the touch does not meet the predetermined level, then in step 1250 the touch is rejected.

It should be noted that additional steps may be added to the above method and that steps may be combined or omitted as desired.

Figure 13:
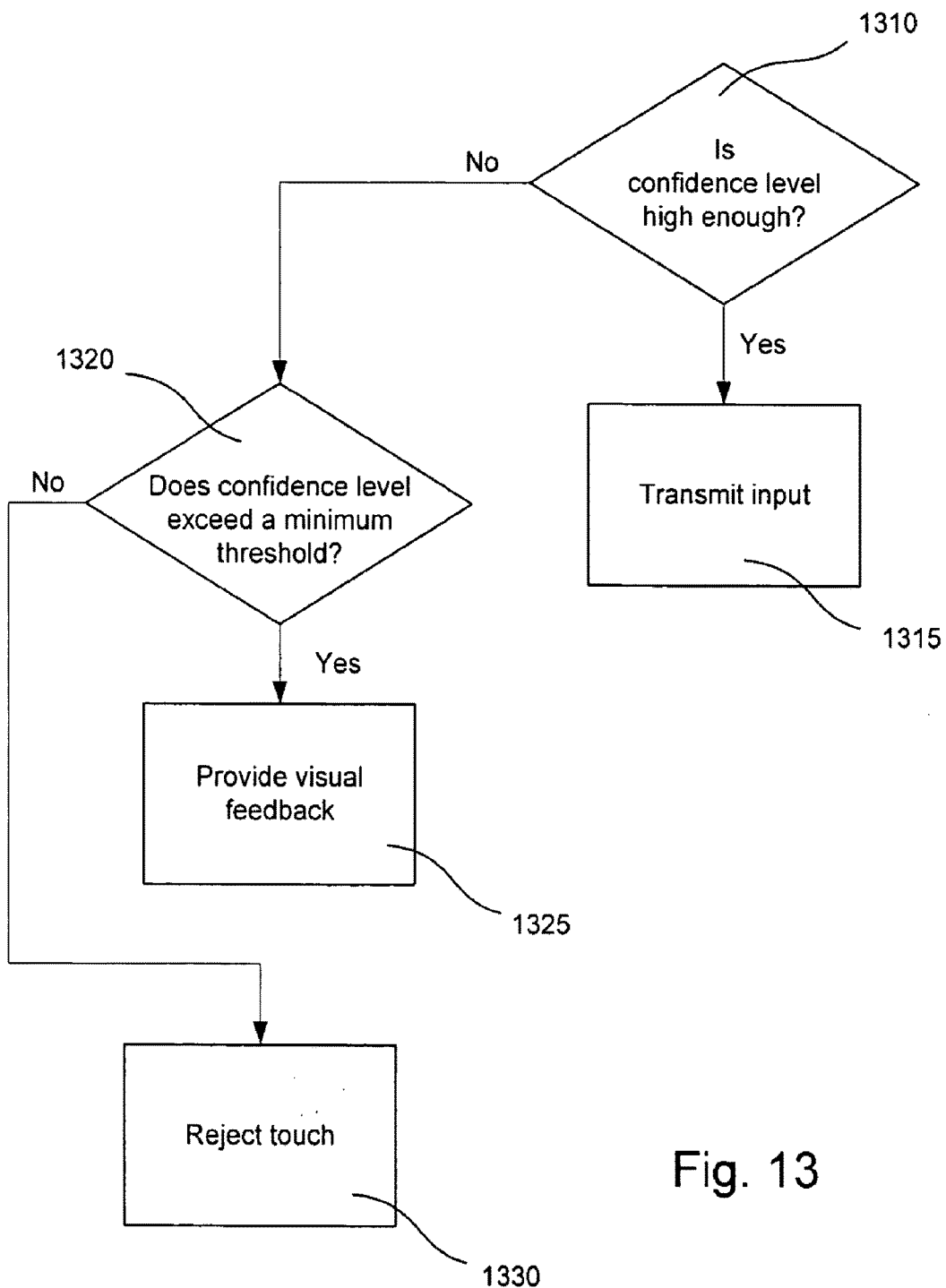
FIG. 13 illustrates a method for evaluating a confidence level of a touch that may be used in accordance with one or more aspects of the present invention.

Turning to FIG. 13, an embodiment of a two step method of evaluating a confidence level of a touch is disclosed. As can be appreciated, the method of FIGS. 12 and 13 could be combined. First in step 1310, a check is made to see if the confidence level of the touch exceeds a predetermined level. If the confidence level does exceed the predetermined level, then in step 1315 an input associated with the touch is communicated or transmitted to the application.

If the confidence level of the touch does not meet the predetermined level, then in step 1320 a second check is made to see if the confidence level of the touch exceeds a threshold level. If the confidence level does exceed the threshold level, in step 1325 a visual feedback is provided to the user. In at least some embodiments a cursor or a widget or some other graphical indicator may be moved to or near the location where the touch is located. However, if the input fails to meet the threshold level, in step 1330 the touch is rejected.

It should be noted that as the touch probably represents a finger or palm, it may be useful to make the cursor, or whatever graphical feedback is used, observable even if the user's hand is partial occluding a portion of the display. In an embodiment, a widget, such as a graphical user interface that may be used to provide additional precision when a user is interacting using a finger, may be positioned near the touch contact. As can be appreciated, this provides the user with feedback that something has caused the widget to move. The user can appreciate that an inadvertent touch may have caused the widget to move. However, no actual input will be transmitted in this embodiment; therefore the user does not have to undo something that was unintentional. Furthermore, if the user intended to provide an input but did so in a manner that is interpreted as a low confidence level touch, the user will be able to use the widget to provide the desired input and will not be frustrated by the rejection of intentional input.

Returning to FIG. 10, as can now be appreciated, the confidence levels C1-C5 may be related. In an embodiment, each of the columns represents a subsequent period of time for the same touch. An initially high R1 value may not provide a high confidence level because of the limited historical knowledge regarding the touch. As the reliability value continues to be high for R2-R5, however, the historical values and a minimal amount of variability allow the confidence level to be generated as high for all the touches represented by each column. Thus, the detected touches may be treated as intentional touches.

Conversely, if the reliability value fluctuates with time or the touch moves outside an expected region of contact, the confidence level, which may have started out higher, will drop. Therefore, it may be useful to delay the decision of whether to communicate the touch as an input or to reject it.

While delaying the determination of whether to reject the touch allows for a more accurate determination, the user typically wants the system's response to be fluid and immediate. To minimize the user's perception of the delay, therefore, the reliability data can be transmitted as generated and the software module 1115 (FIG. 11) can control the delay. The delay may be varied depending on the confidence level, the location of the touch and the state of an application (e.g. whether the application is expecting an input). While not required, the reliability value and other data associated with the touch may be transmitted to the software module 1115 using a universal serial bus 2.0 protocol. As can be appreciated, the advantage of using such a protocol is the availability of relatively high bandwidths, thus even relatively high sampling frequencies may be used effectively. In addition, an increased bandwidth allows greater levels of detail to be passed along so that the confidence level determination may take into account additional information.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Numerous other embodiments, modifications and variations within the scope and spirit of the appended claims will occur to persons of ordinary skill in the art from a review of this disclosure.

We claim:

1. A method comprising:
receiving a touch on a touch-sensitive display of a device;
calculating a function based on an acceleration of the touch;
based at least in part on the calculated function and at least one other characteristic of the touch, determining a probability that the touch is intentional; and
based at least in part on the determined probability indicating that the touch is an intentional touch, communicating an input associated with the touch to an application.

2. The method of claim 1, further comprising:
determining a location of the touch over time.

3. The method of claim 1, further comprising:
determining that the touch is too fast to be representative of a human touch.

4. The method of claim 1, further comprising:
calculating a confidence level for the touch based on the determined probability; and
comparing the confidence level for the touch to a predetermined confidence level.

5. The method of claim 4, wherein the confidence level for the touch is based at least in part on determining a reliability of the touch.

6. The method of claim 1, further comprising:
determining a level of noise associated with measuring the acceleration of the touch.

7. The method of claim 6, wherein determining the probability that the touch is intentional is based at least in part on the level of noise.

8. A computing device comprising:
at least one processing unit; and
at least one memory storing computer readable instructions that when executed by the at least one processing unit cause the computing device to:
receive a first touch on a touch-sensitive display of a device;
receive at least a second touch at substantially the same time;
based at least in part on a proximity of a first location of the first touch and second location of the second touch, determine a probability that the first touch is intentional; and
based at least in part on the determined probability indicating that the first touch is an intentional touch, communicate an input associated with the touch to an application.

9. The computing device of claim 8, the computer readable instructions when executed by the at least one processing unit further causing the computing device to:
determine whether multiple touches are expected.

10. The computing device of claim 8, wherein the second location of the second touch is different than the first location of the first touch, the computer readable instructions when executed by the at least one processing unit further causing the computing device to:
determine that the second touch is a valid touch.

11. The computing device of claim 8, the computer readable instructions when executed by the at least one processing unit further causing the computing device to:
identify the first location of the first touch and the second location of the second touch within the touch-sensitive display.

12. The computing device of claim 11, the computer readable instructions when executed by the at least one processing unit further causing the computing device to determine an activity context comprising one or more of:
determine whether the first location of the first touch is in a window associated with an application; and
determine whether the application is active.

13. The computing device of claim 8, the computer readable instructions when executed by the at least one processing unit further causing the computing device to:
determine whether a profile of the touch matches a known gesture.

14. A computer storage device not consisting of a carrier wave and comprising computer readable instructions that when executed by a processing unit cause a computing device to perform a method, the method comprising:
receiving a touch on a touch-sensitive display of a device;
determining a time period over which the touch is received;
based at least in part on the time period and at least one other characteristic of the touch, determining a probability that the touch is intentional; and
based at least in part on the determined probability indicating that the touch is an intentional touch, communicating an input associated with the touch to an application.

15. The computer storage device not consisting of a carrier wave of claim 14, wherein the touch is represented by multiple different reliability values over the time period.

16. The computer storage device not consisting of a carrier wave of claim 14, further comprising determining an activity context comprising:
determining a second time period during which the application waited for an input.

17. The computer storage device not consisting of a carrier wave of claim 14, further comprising:
determining that the touch has progressed through a range of shapes and sizes over the time period.

18. The computer storage device not consisting of a carrier wave of claim 17, further comprising:
   determining that the touch is not an intentional touch.

19. The computer storage device not consisting of a carrier wave of claim 14, further comprising:
   determining that the touch moves outside of an expected region of contact over the time period.

20. The computer storage device not consisting of a carrier wave of claim 19, further comprising:
   determining that a confidence level associate with the touch has decreased over the time period.

* * * * *